US006809757B1

(12) United States Patent
Ito et al.

(10) Patent No.: US 6,809,757 B1
(45) Date of Patent: Oct. 26, 2004

(54) IMAGE PROCESSING SYSTEM

(75) Inventors: Kan Ito, Machida (JP); Tomishige Taguchi, Urawa (JP); Shozo Endo, Kawasaki (JP); Atsushi Inagaki, Yokohama (JP); Hiroyuki Kawahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/986,633

(22) Filed: Dec. 8, 1997

Related U.S. Application Data

(62) Division of application No. 08/958,742, filed on Oct. 27, 1997, now Pat. No. 6,147,704, which is a continuation of application No. 08/732,915, filed on Oct. 17, 1996, now abandoned, which is a division of application No. 08/339,880, filed on Nov. 14, 1994, now Pat. No. 5,617,138, which is a continuation of application No. 08/026,181, filed on Mar. 1, 1993, now abandoned, which is a continuation of application No. 08/026,181, filed on Mar. 1, 1993, now abandoned, which is a division of application No. 07/788,302, filed on Nov. 5, 1991, now abandoned.

(30) Foreign Application Priority Data

| Nov. 8, 1990 | (JP) | ............................................ 2-304958 |
| Dec. 25, 1990 | (JP) | ............................................ 2-405794 |
| Dec. 25, 1990 | (JP) | ............................................ 2-405832 |
| Jan. 9, 1991 | (JP) | ................................................ 3-992 |
| Oct. 24, 1991 | (JP) | ............................................ 3-277887 |

(51) Int. Cl.[7] ............................. H04N 9/47; H04N 9/74; G03B 15/00
(52) U.S. Cl. ............................. 348/143; 348/588; 396/2
(58) Field of Search ........................ 348/143, 61, 207, 348/233, 231, 588, 333.06, 207.99, 231.99, 231.1, 231.2, 231.6; 396/2

(56) References Cited

U.S. PATENT DOCUMENTS

| 3,693,522 | A | * | 9/1972 | Chiesa .......................... 396/2 |
| 4,802,019 | A | * | 1/1989 | Harada et al. .............. 348/588 |
| 4,864,410 | A | * | 9/1989 | Andrews et al. ............ 348/588 |
| 5,742,339 | A | * | 4/1998 | Wakui ........................ 348/233 |
| 5,742,341 | A | * | 4/1998 | Ohishi et al. ............... 348/333 |
| 5,835,136 | A | * | 11/1998 | Watanabe et al. ........... 348/207 |

FOREIGN PATENT DOCUMENTS

| JP | 2-086451 | 3/1990 | .............. B41J/2/00 |
| JP | 2-153497 | 6/1990 | ............ G07F/17/26 |
| JP | 2-234280 | 9/1990 | ............ G06F/15/64 |

* cited by examiner

*Primary Examiner*—Wendy R. Garber
*Assistant Examiner*—Rashawn N. Tillery
(74) *Attorney, Agent, or Firm*—Fitzpatrick, Cella, Harper & Scinto

(57) ABSTRACT

An image processing apparatus includes a pick-up for picking-up a subject, temporal storage for temporarily storing sets of image information picked up by the pick-up during predetermined time periods, and a display for displaying the stored sets of image information and image information from the pick-up. A subject views the display during image pick-up. Also included is a control that causes temporal storage to store the sets of image information corresponding to the same subject picked up by the pick-up during the predetermined time periods, and causes display of the sets of image information corresponding to the same subject and stored in temporal storage discriminatively from the image information from the pick-up. At least one of the sets of image information is selected corresponding to the same subject in temporal storage.

40 Claims, 28 Drawing Sheets

| HEX CODE | MEANING OF CODE |
|---|---|
| 00H | IDLING STATE WITH POWER ON |
| 01H | WAITING STATE FOR TEMPERATURE RISING OF HEAD |
| 02H | HEAD OVER-HEATING STATE, PRINT UNENABLE |
| 10H | IN NORMAL PRINTING |
| 20H | PRINTING COMPLETE |
| E1H | RUNNING SHORT OF PAPER OR INK SHEET |
| E2H | STOPPING UP PAPER OR INK SHEET |

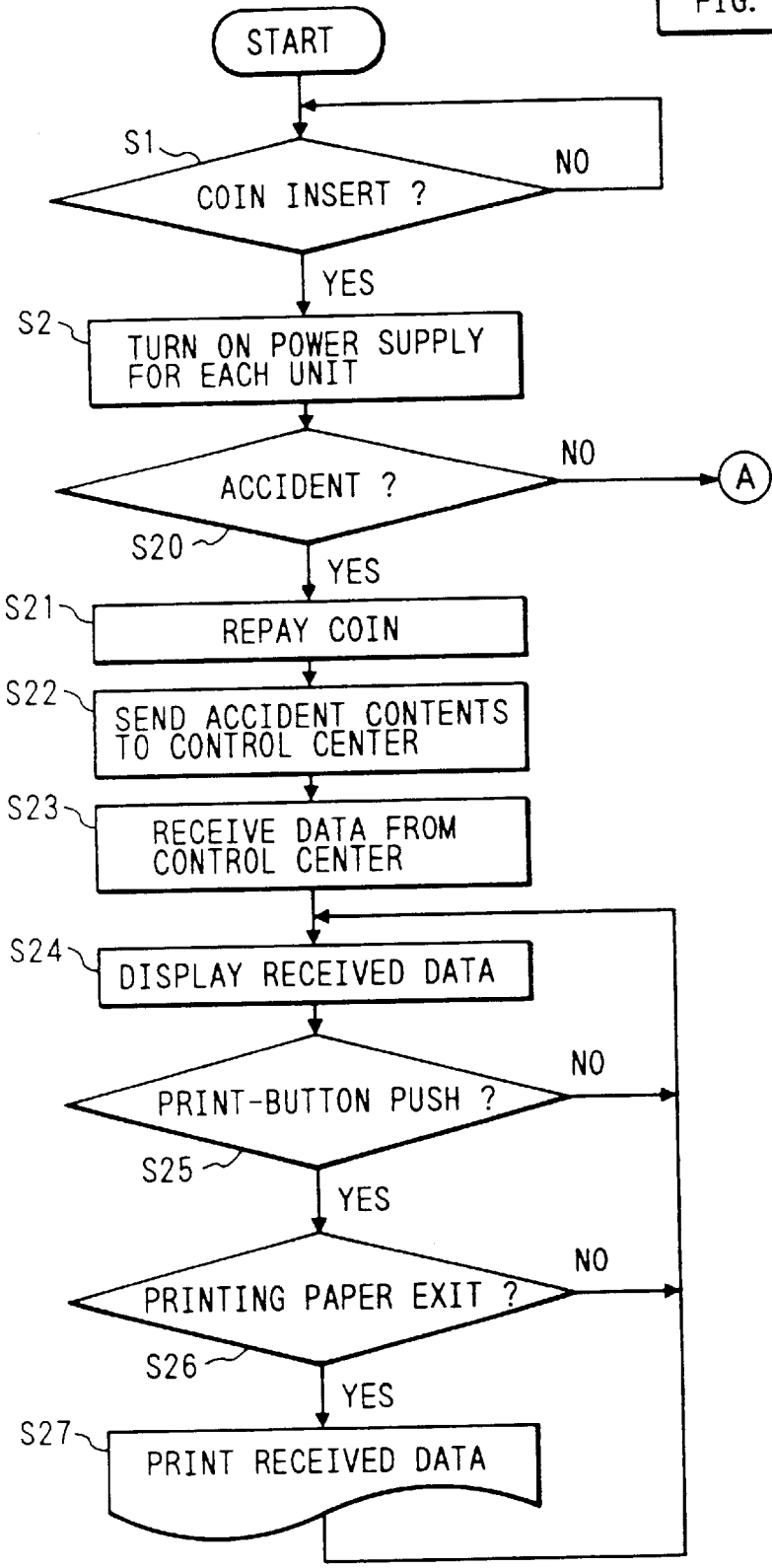

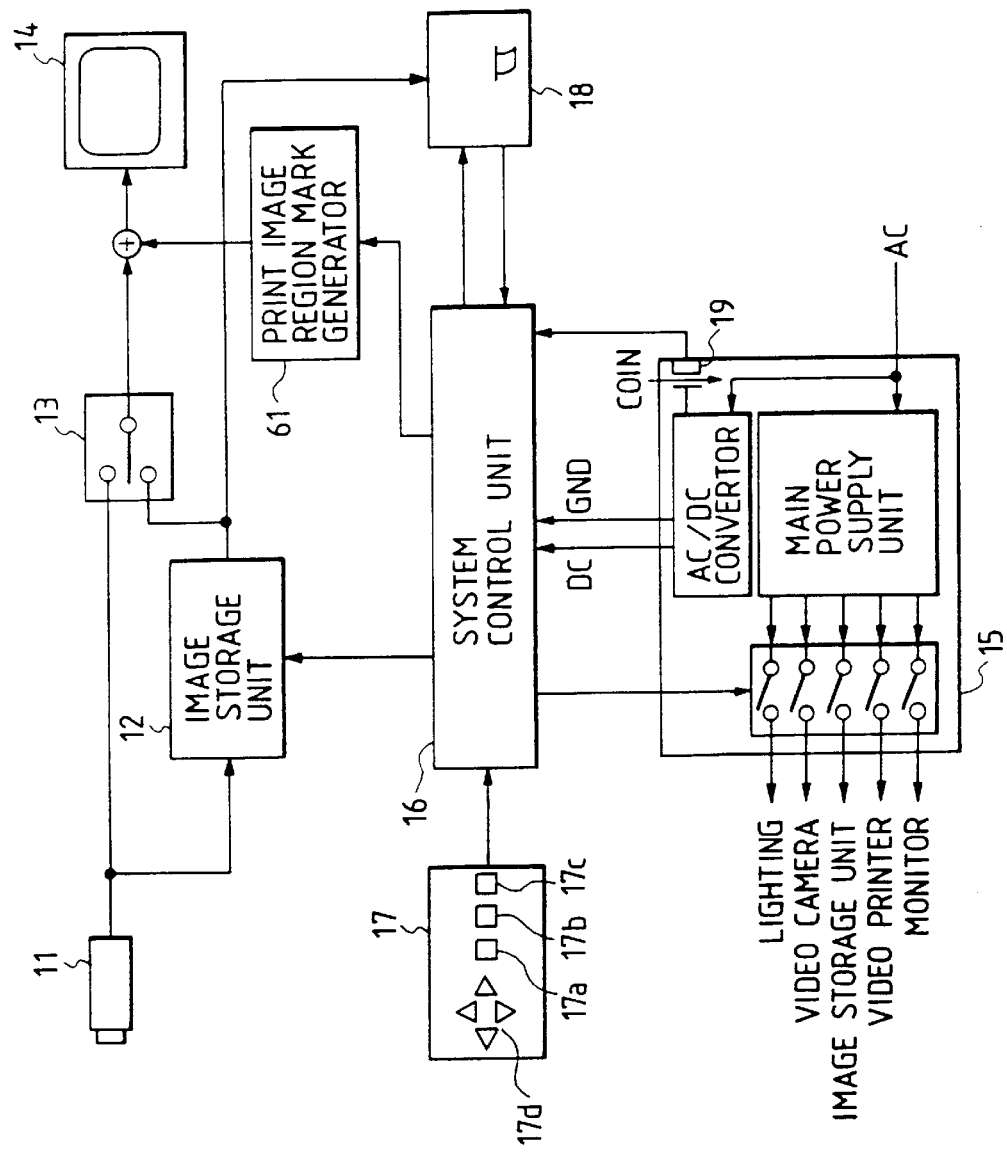

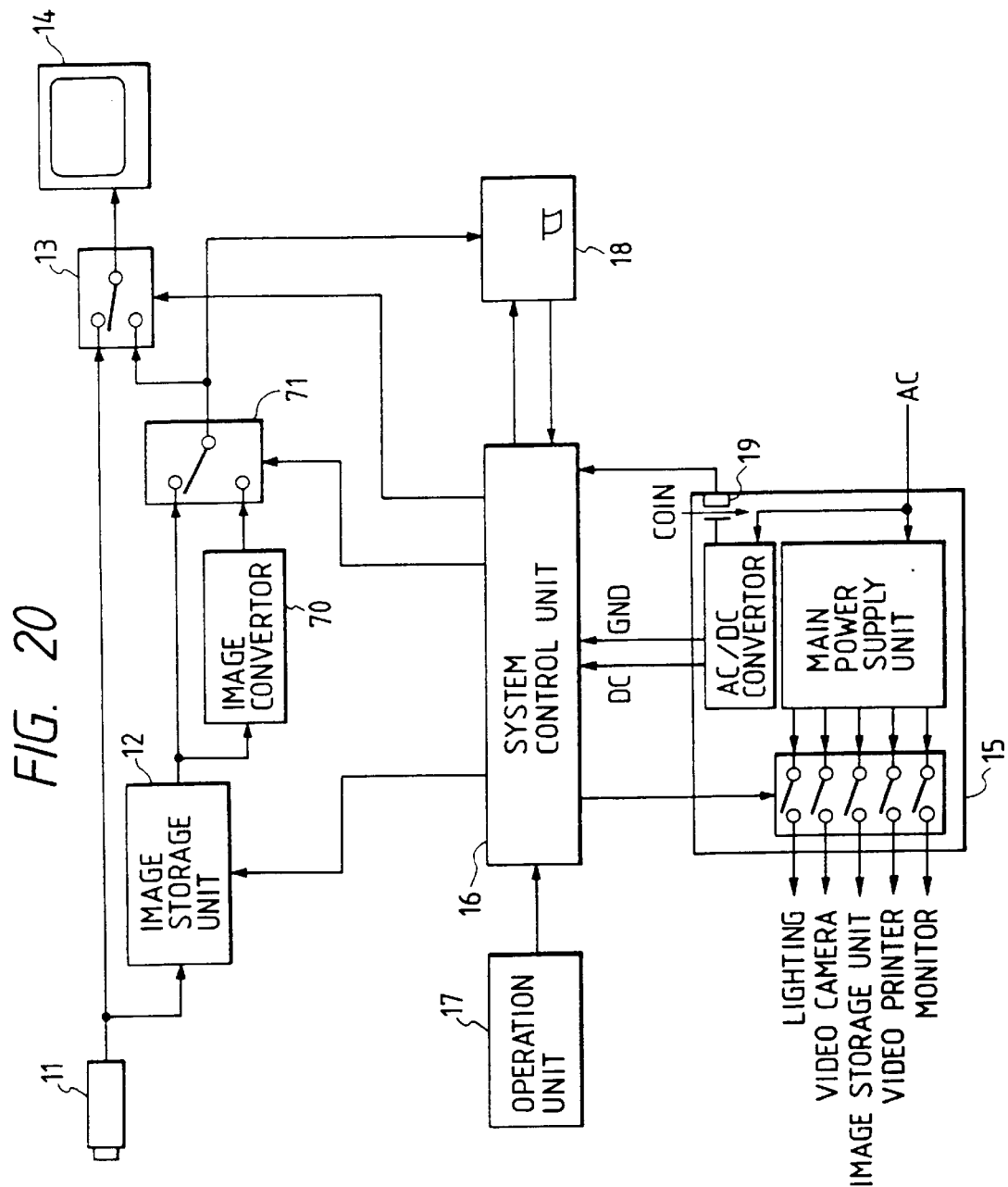

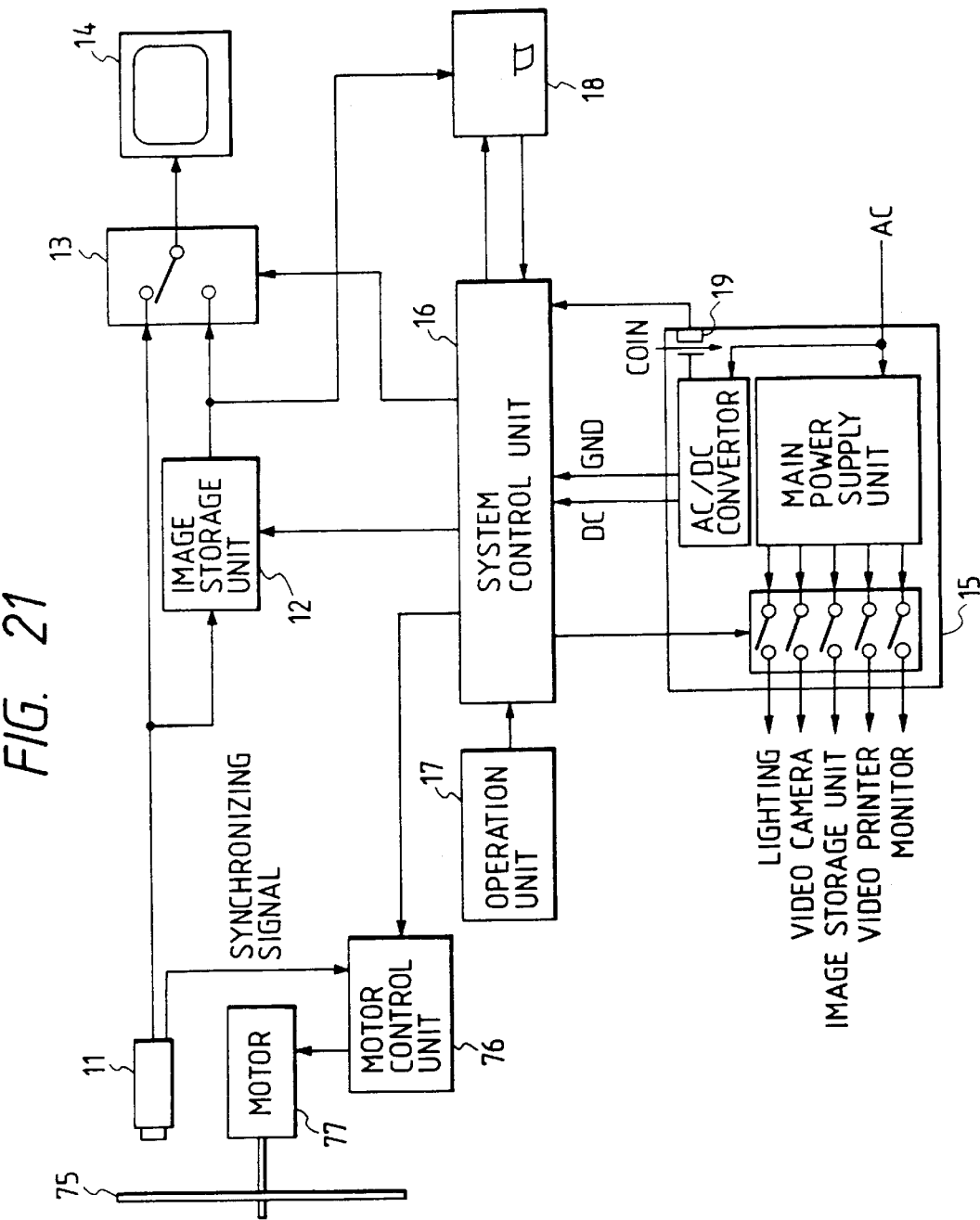

FIRST FIELD MEMORY

SECOND FIELD MEMORY

FIG. 35
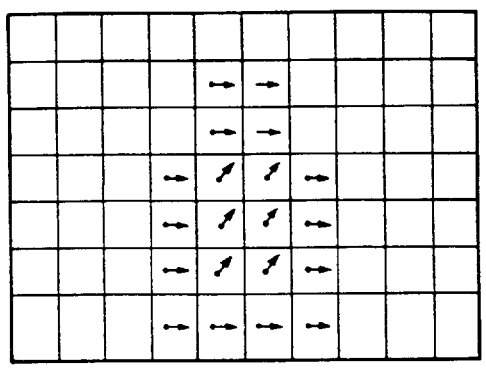
FIG. 36
| 1 | 1 | 1 | 1 | 1 | 1 | 1 | 1 | 1 |
|---|---|---|---|---|---|---|---|---|
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
FIRST FIELD
FIG. 37
| 2 | 2 | 2 | 2 | 2 | 2 | 2 | 2 | 2 |
|---|---|---|---|---|---|---|---|---|
| 2 | 2 | 2 | 2 | 1 | 1 | 2 | 2 | 2 |
| 2 | 2 | 2 | 2 | 1 | 1 | 2 | 2 | 2 |
| 2 | 2 | 2 | 1 | 1 | 1 | 1 | 2 | 2 |
| 2 | 2 | 2 | 1 | 1 | 1 | 1 | 2 | 2 |
| 2 | 2 | 2 | 1 | 1 | 1 | 1 | 2 | 2 |
| 2 | 2 | 2 | 1 | 1 | 1 | 1 | 2 | 2 |
SECOND FIELD
FIG. 38
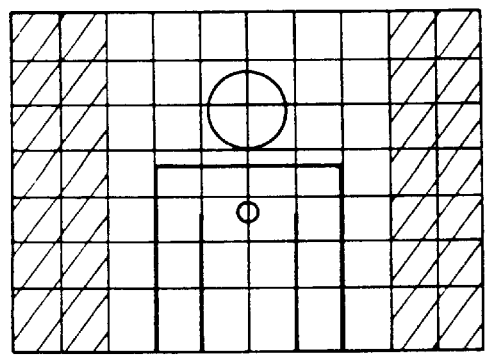

IMAGE PROCESSING SYSTEM

CROSS REFERENCE TO RELATED APPLICATIONS

This application is a divisional of Ser. No. 08/958,742, filed Oct. 27, 1997, now U.S. Pat. No. 6,147,704, which was a continuation of Ser. No. 08/732,915, filed Oct. 17, 1996, now abandoned, which was a divisional of Ser. No. 08/339,880, filed Nov. 14, 1994, now U.S. Pat. No. 5,617,138, which was a continuation of Ser. No. 08/026,181, filed Mar. 1, 1993, now abandoned, which was a divisional of Ser. No. 07/788,302, filed Nov. 5, 1991, now abandoned.

BACKGROUND OF THE INVENTION

1. Field of the Invention

The present invention relates to an image processing system for photographing an object and printing a photographed image.

2. Related Background Art

Conventionally, photo booth apparatuses have been provided for automatically taking a picture for the identification card or passport with the input of a coin, in which the apparatus comprises a camera, a photo developing unit and a flash with the optical silver salt photography.

However, with such apparatuses, due to pollution problems resulting from the use of chemicals to develop the photo, some limitations were imposed on the installing location, or great labors were taken for the maintenance of apparatus.

Also, it took some time to perform the chemical processing for development, so that the user had to wait for a picture to be completed for about five minutes, after the picture was taken.

Furthermore, there was a drawback that a photographed result was not seen until it was developed, and if the photographing might fail, the sheet was wasted or the fee was charged irrespective of the failure because the picture had been already printed on the sheet.

Also, it was impossible to take a plurality of photographs and print only the best photographed picture among them.

Furthermore, there was a drawback that when supplies were used up or the apparatus might fail, the service was only inhibited, and an abnormal condition of the apparatus could be first detected by a service man in the round inspection, so that the user could not use the apparatus for a long term, which was inconvenient for the user and unprofitable for the dealer.

Also, since the black-and-white apparatus and the color apparatus were separately provided, it was necessary to search about for an apparatus which allows a desired picture to be taken.

Furthermore, there was a drawback that if various functions were installed, the cost would be raised.

Furthermore, it was impossible to print images other than those photographed with the same apparatus.

SUMMARY OF THE INVENTION

The present invention was achieved in view of the above-mentioned respects, and its object is to provide an improved image processing apparatus.

Further, it is an object of the present invention to provide an image processing system without anxieties of the pollution.

Further, it is an object of the present invention to provide an image processing system with a simple construction and of an easy maintenance.

Further, it is an object of the present invention to provide an image processing system which is always available to the user, and capable of rapid processing.

Further, it is an object of the present invention to provide an image processing apparatus which allows a photographed result desired by the user to be printed.

Further, it is an object of the present invention to provide an image processing apparatus which allows a failure of the apparatus to be detected at early time.

Further, it is an object of the present invention to provide an image processing system capable of printing both the color and black-and-white pictures.

Further, it is an object of the present invention to provide an image processing system which allows various functions to be implemented at low cost.

Further, it is an object of the present invention to provide an image processing system which allows various images to be printed.

Other objects and features of the present invention will be apparent from the following description and the drawings.

BRIEF DESCRIPTION OF THE DRAWINGS

FIG. 10 is a block diagram of an image processing system in another example.

FIG. 20 is a block diagram of an image processing system in another example.

FIG. 21 is a block diagram of an image processing system in another example.

FIG. 35 is a view showing detected movement vectors.

FIG. 36 is a view showing the image in the first field after the correction for the blurring.

FIG. 37 is a view showing the image in the second field after correction for the blurring.

FIG. 38 is a view showing a printed image image after the correction for the blurring.

DETAILED DESCRIPTION OF PREFERRED EMBODIMENTS

The preferred embodiments will be described below in detail with reference to the drawings.

Figure 1:
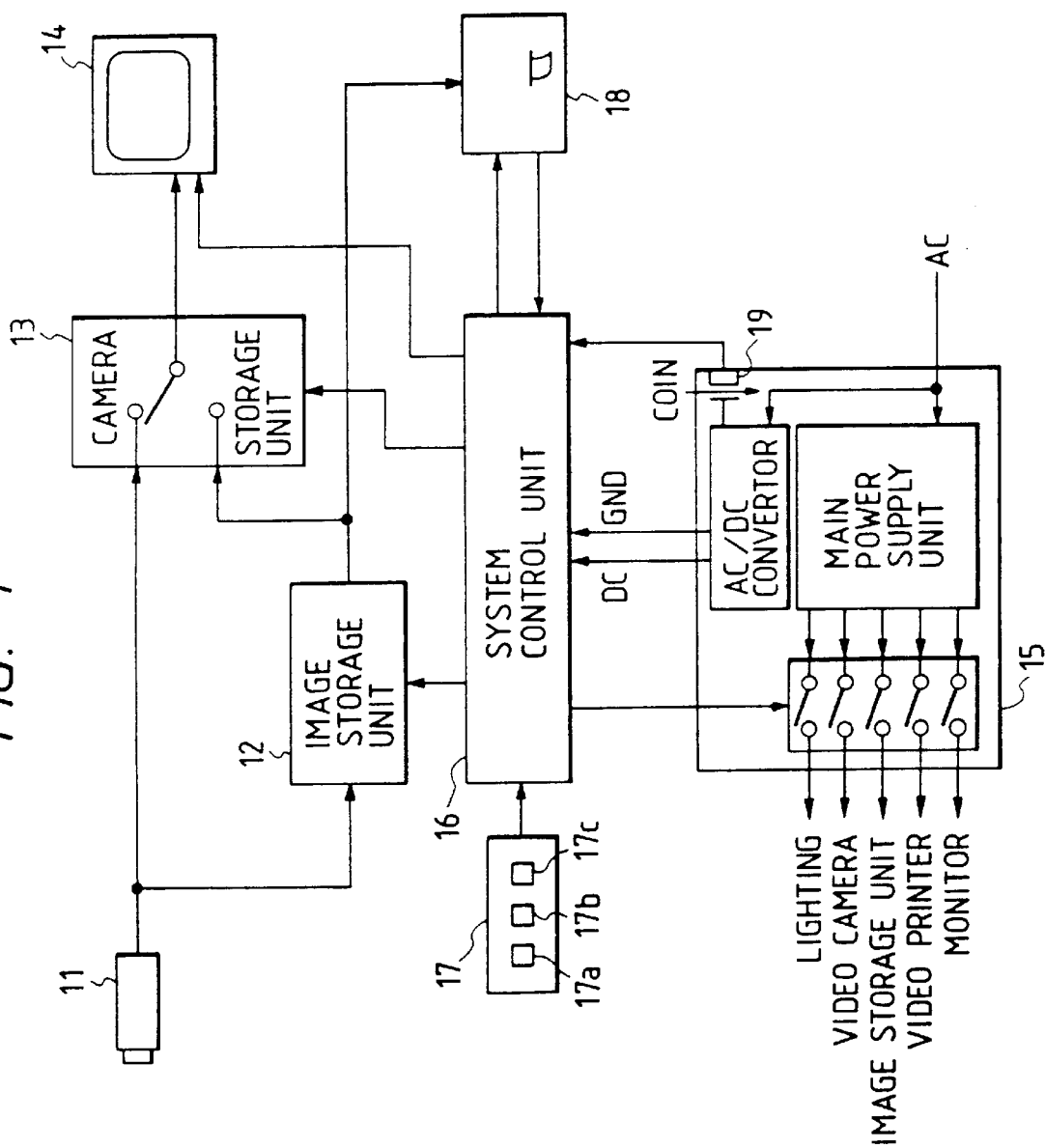
FIG. 1 is a block diagram of an image processing system in an example of the present invention.

FIG. 1 is a block diagram of an image processing system in one example of the present invention. 11 is an image pick-up unit consisting of a video camera, 12 is an image storage unit constituted of a semiconductor memory, for example, for storing the image information from the video camera 11, 13 is a monitor output screen changeover switch, 14 is a monitor, and 15 is a power supply unit for supplying the power to each unit. 16 is a system control unit for controlling the operation of each unit, which is constituted of CPU, RAM, and ROM (not shown). The RAM is used as a work area for the CPU, and the ROM has written the contents of control operation or the message data to be displayed on the monitor. 17 is an operation unit for operating the system control unit, comprising a shutter button 17a for starting the storage of image, a print button 17b for starting the print of stored image, and a cancel button 17c for cancelling the stored image to reset the system to a photographing wait state. 18 is a video printer such as a thermal printer, or a bubble jet printer for discharging the ink by the use of the pressure of bubbles generated by the heat. 19 is a detector for detecting the input of a coin.

Figure 2:
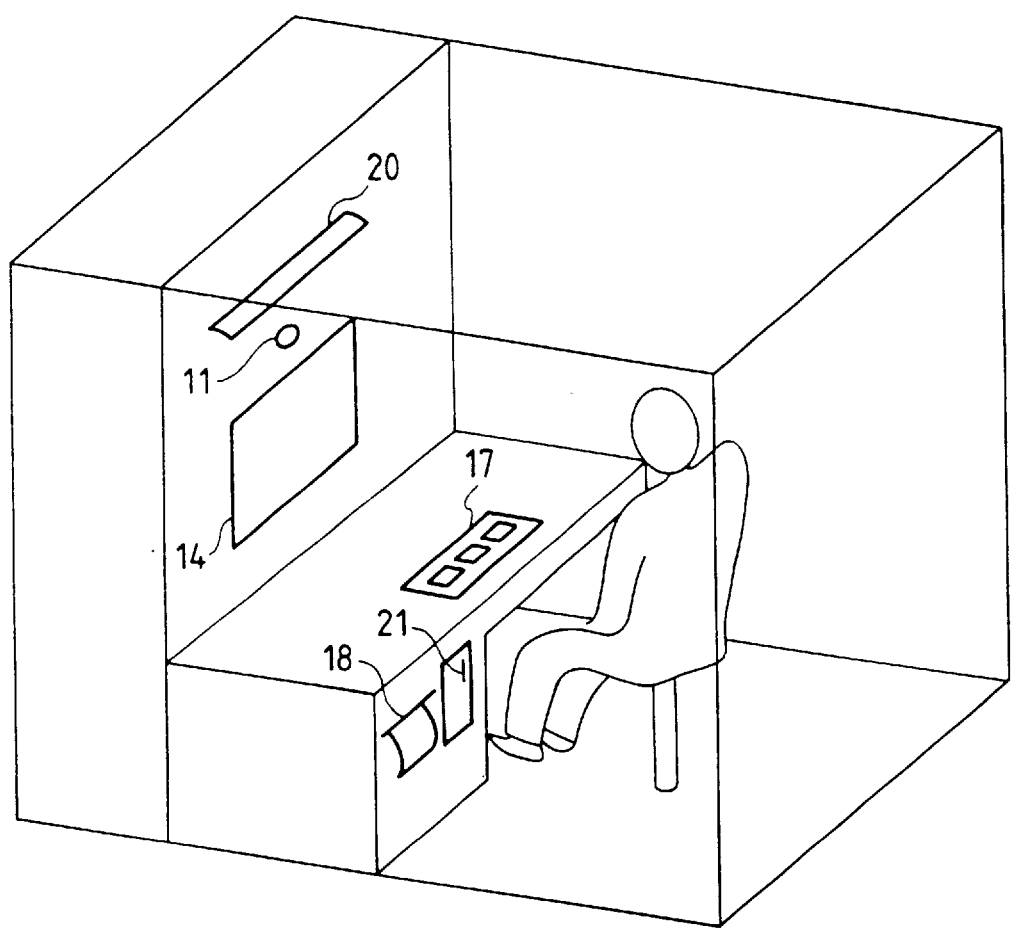
FIG. 2 is an external view of the image processing system in the example.

FIG. 2 is an external view of this example. 20 is a lighting for lighting an object, such as a fluorescent lamp. 21 is a coin slot.

Figure 3:
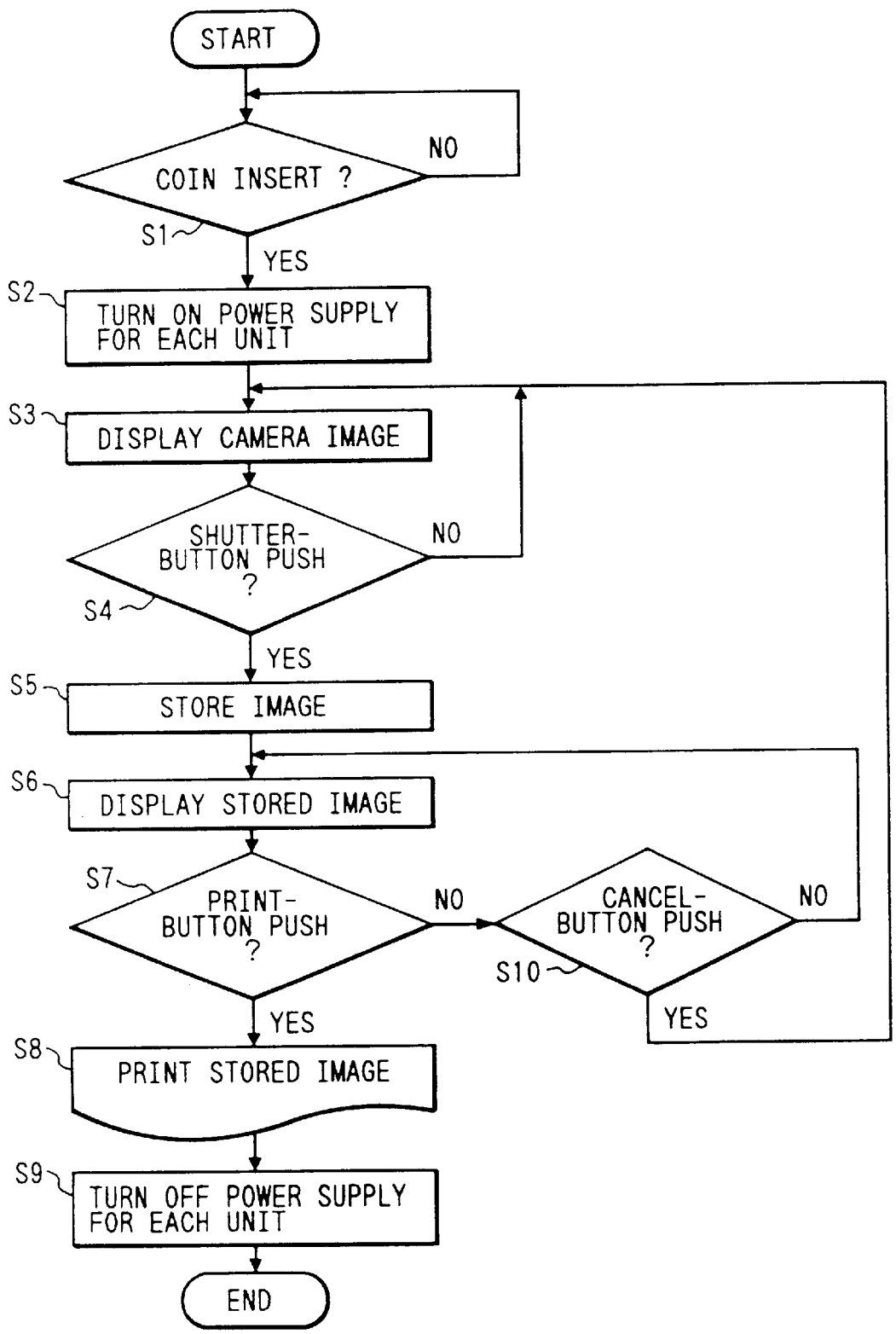
FIG. 3 is a flowchart of the operation in a system control unit 16 as shown in FIG. 1.

A flowchart of the operation in the system control unit 16 of an electronic photo system having the above configuration is shown in FIG. 3. If the coin detector 19 detects a coin, a coin insertion signal is sent to the system control unit 16 (step S1). The system control unit 16 which has received the coin insertion signal sends a signal to the power supply unit 15 to start the supply of the electric power to each unit (step S2). Next, the switch 13 is changed to the camera side to display an image being currently picked up directly on the monitor 14 (step S3). If the shutter button 17a of the operation unit 17 is depressed (step S4), the image being picked up at that time is stored as a still image into the image storage unit 12 (step S5).

Next, the switch 13 is changed to the storage unit side to display the stored image on the monitor 14, so that the user can confirm the image to be printed (step S6). If the print button 17b of the operation unit 17 is depressed (step S7), the stored image is printed with the video printer 18 (step S8). After the completion of the print, a print termination signal is sent from the video printer 18 to the system control unit 17, and further a signal is sent to the power supply unit 15 to turn off the supply of the power to each unit (step S9). Then the operation is terminated. At step S7, if the cancel button 17c, rather than the print button 17b, is depressed, the operation proceeds to step S10 to be placed in a storing wait state, while if the cancel button 17c is not depressed, the operation proceeds to step S6 to be placed in a printing wait state (step S10).

It will be appreciated that a photograph can be taken in a correct attitude such that if the shutter button 17a of the operation unit 17 is depressed in photographing, an image being currently picked up is stored under the control of the system control unit 16 when a predetermined count value is reached by counting up with a counter contained within the system control unit 16.

It will be also appreciated that a photograph can be taken in a correct attitude such that the shutter button 17a of the operation unit 17 is disposed at the foot of the photographer to depress the shutter button 17a with his foot. Further, the flash photography can be implemented by the use of a flash lamp as the lighting 20.

Thereby, it is possible to obtain a more favorable picture because of the effective measures against the pollution, the easy maintenance, a shortened time for the completion of a picture, and the savings of print cost and print sheets.

Another example will be described below.

Figure 4:
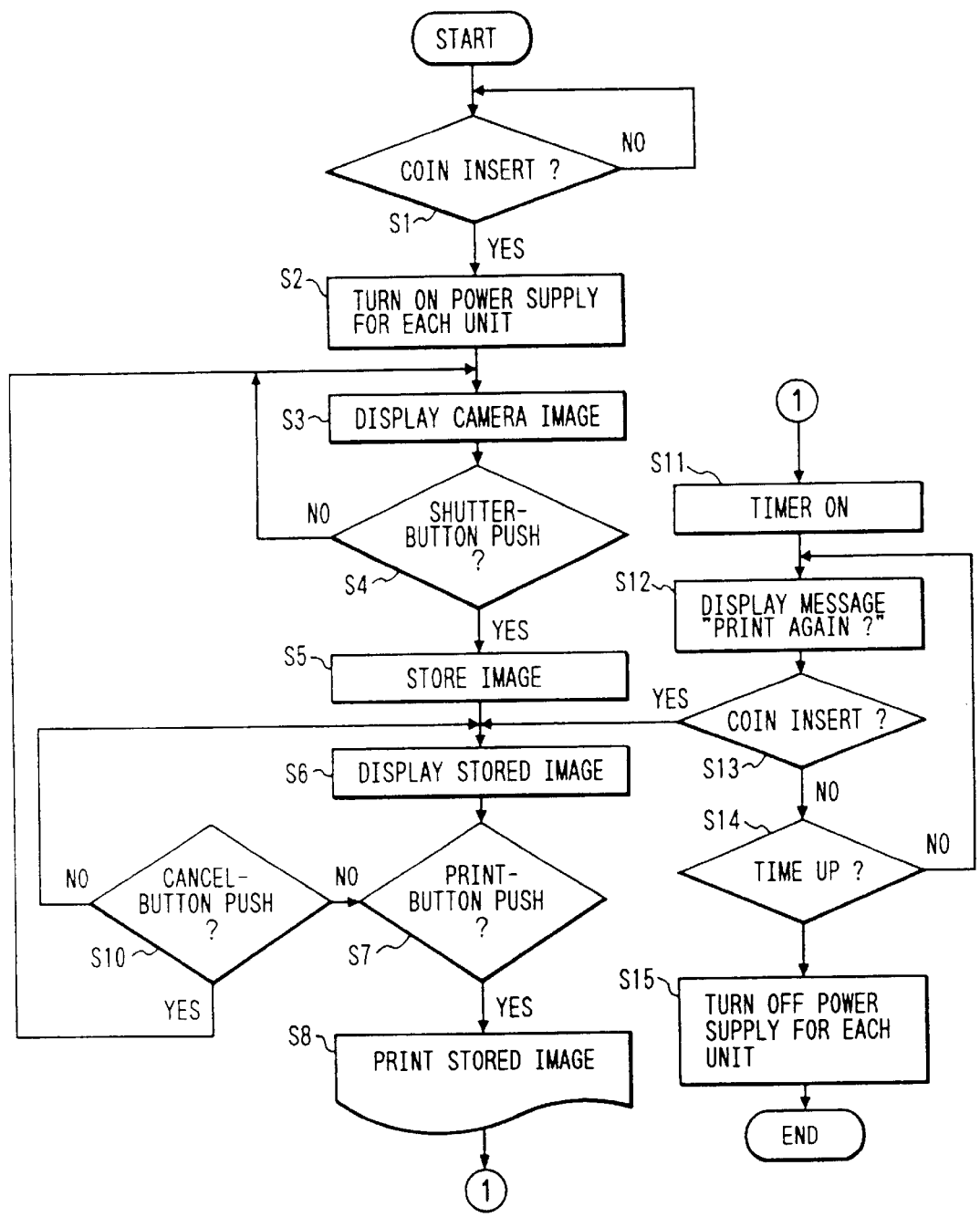
FIG. 4 is a flowchart of another operation in the system control unit 16 as shown in FIG. 1.

FIG. 4 is a flowchart showing the operation of an image processing system in another example of the present invention. The block diagram of this example is the same as in FIG. 1. This example allows the same picture to be printed on plural sheets. The steps S1 to S10 are the same as in FIG. 3, and the explanation will be omitted. After the stored image has been printed at step S8, a timer within the system control unit 16 is turned on (step S11), and a message notifying whether or not the currently stored image should be further printed (e.g., "Insert a coin if one more sheet is printed") is displayed on the monitor 14 (step S12). If the coin is detected, the operation proceeds to step S6 to be placed in a printing wait state (step S13). If the coin is not detected at step S13, it is examined whether or not a predetermined time has passed with the timer of the system control unit 16 (step S14). If the predetermined time has not passed at step S14, the operation proceeds to step S12 to wait for the input of a coin, while if the predetermined time has passed, a signal is sent from the system control unit 17 to the power supply unit 15 to turn off the power supply for each unit (step S15). Then the operation is terminated.

If the inserted coin is detected at step S13, the stored image is displayed on the monitor 14 (step S6), and the operation is placed in a wait state for a print instruction signal of stored image (step S7).

With this configuration, it is possible to print a plurality of pictures for a favorable image which has been once stored.

It will be appreciated that a plurality of pictures for a favorable image can be obtained in such a way that if the print button 17b of the operation unit 17 is depressed after photographing, the system control unit 16a makes the control so that a predetermined number of sheets are printed.

Next, another example of the present invention will be described.

Figure 5:
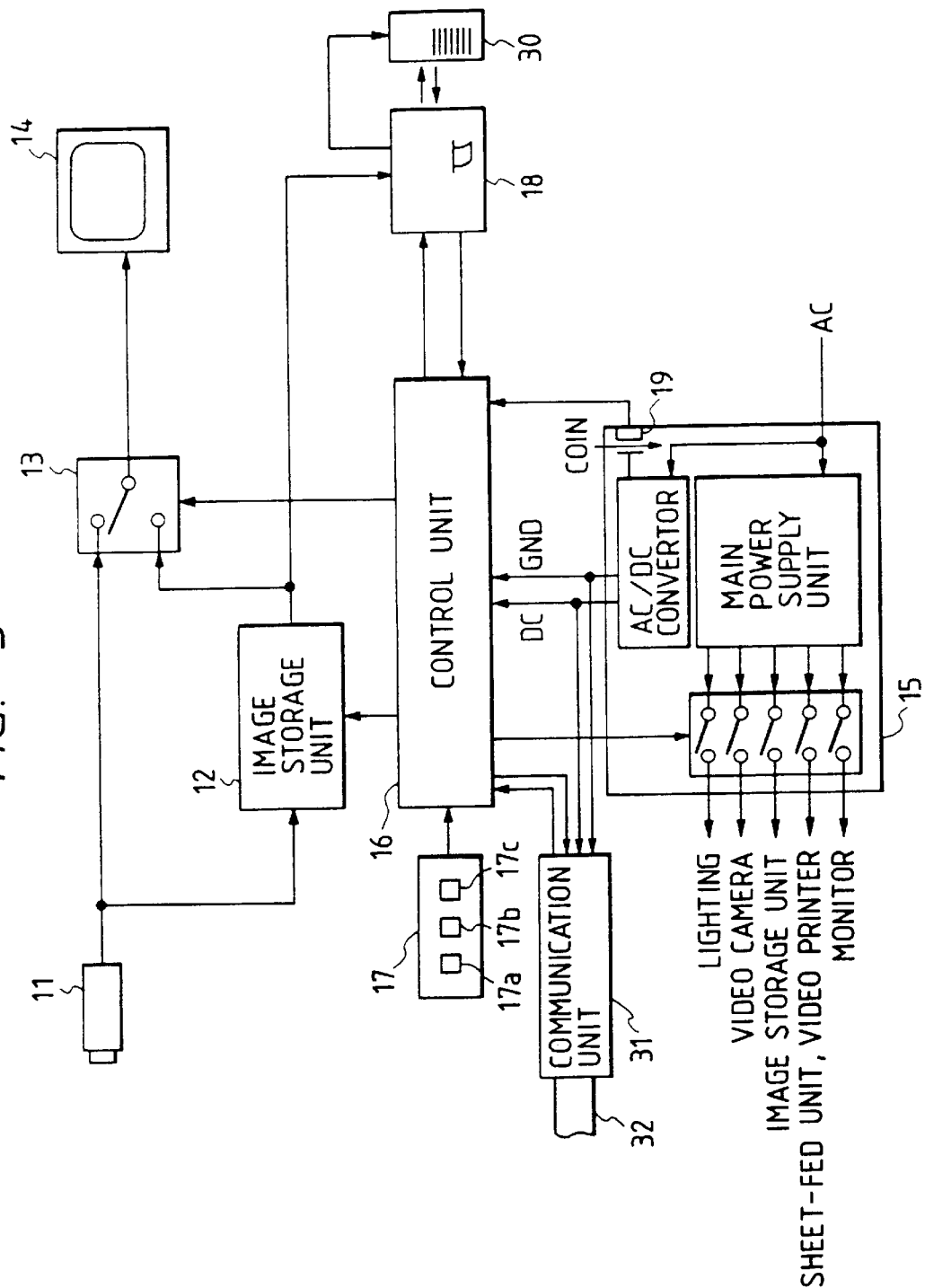
FIG. 5 is a block diagram of an image processing system in another example.

FIG. 5 is a block diagram of an image processing system showing another example of the present invention. 11 to 19 are the same as in FIG. 1.

30 is a sheet-fed unit, 31 is a communication unit for communicating with a control center via a telephone line when the accident occurs, and 32 is the telephone line.

Figures 6, 8:
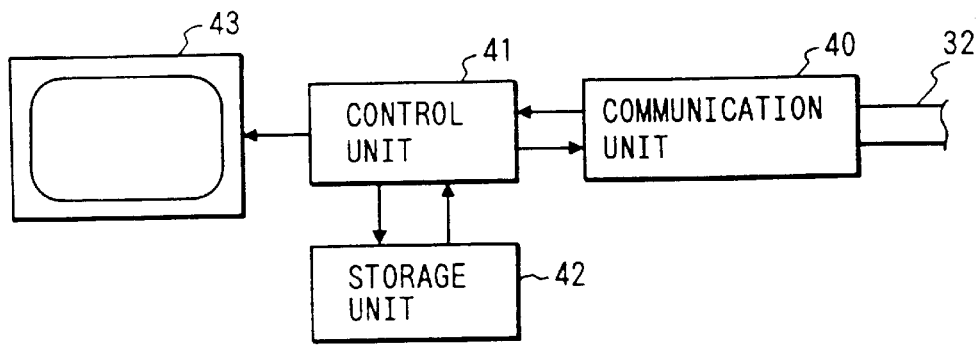
FIG. 6 is a block diagram of a centralized supervisory system for making the centralized supervision of a plurality of image processing system.
FIG. 8 is a table showing the signals indicating the states of a printer 18 as shown in FIG. 5.

FIG. 6 is a block diagram of a centralized supervisory system which makes the centralized supervision over a plurality of image processing systems. 40 is a communication unit for communicating with a plurality of image processing systems via the telephone line 32, and 41 is a control unit for controlling the centralized supervisory system. 42 is a storage unit for storing the status of each image processing system, or map data indicating the location of the nearest available image processing system when the accident may occur in the image processing system. 43 is a monitor for displaying the status of each image processing system under the control of the control unit 41.

Figure 7B:
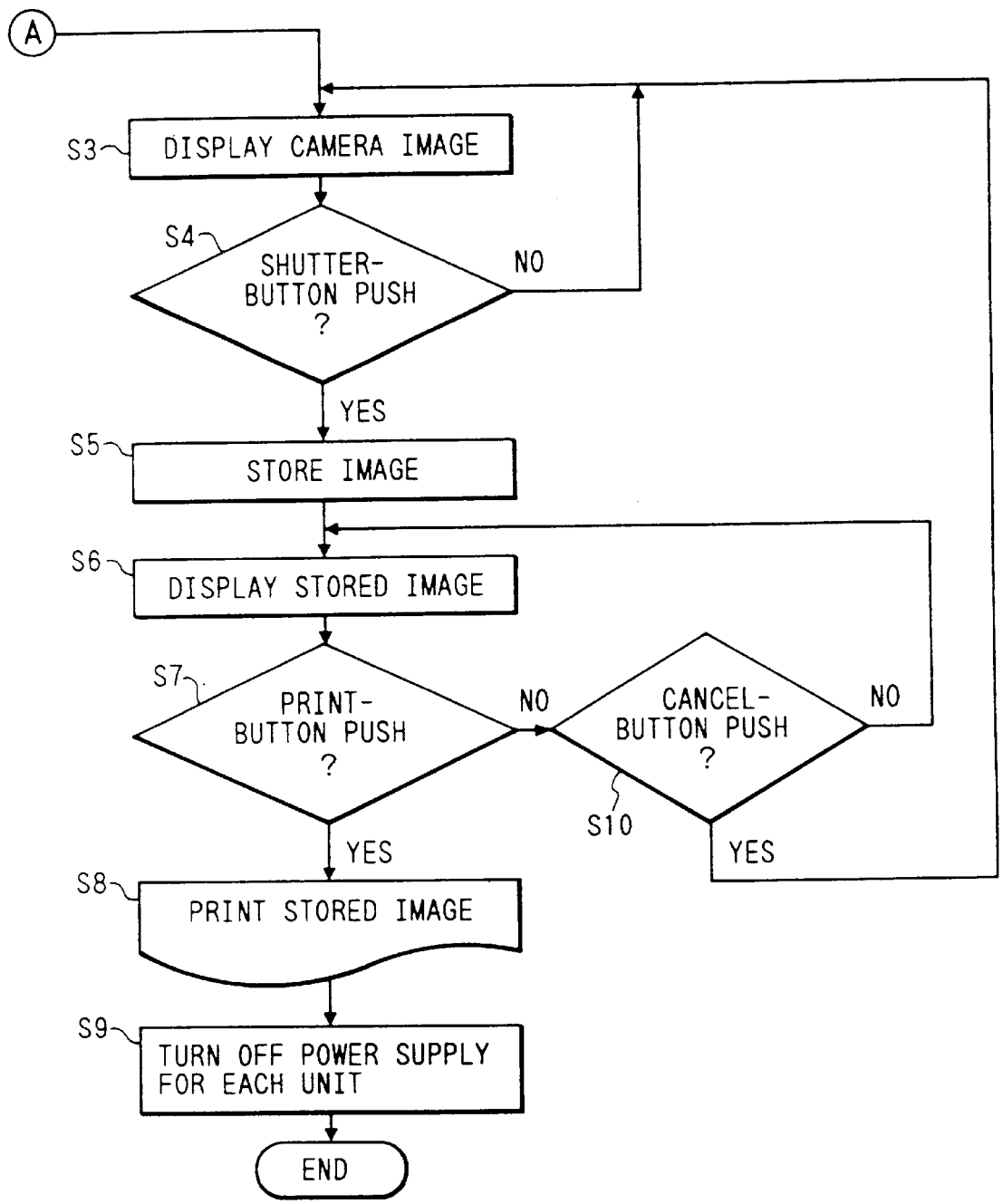
FIG. 7 is a flowchart of the operation in a system control unit 16 as shown in FIG. 5.

A flowchart of the operation in the control unit 16 of the image processing system with the above configuration is shown in FIG. 7. If the coin detector 19 detects a coin, a coin insertion signal is sent to the control unit 16 (step S1). The control unit 16 which has received the coin insertion signal sends a signal to the power supply unit 15 to start the supply of the electric power to each unit (step S2). The control unit 16 receives a status signal as shown in FIG. 8 from the printer 18 at predetermined intervals to determine whether or not the printer 18 is normally operating (step S2). If there is no abnormality such as a shortage or jamming of paper at step S20, the normal control is continued, and the abnormality is checked at predetermined intervals. At the normal condition, the image picked up with the video camera 11 is displayed on the monitor 14 (step S3), and if the shutter button 17a is depressed (step S4), a picked up image upon depressing is stored as a still image (step S5). And the stored image is displayed on the monitor 14 (step S6). If the print button 17b of the operation unit 17 is depressed (step S7), the stored image is printed by the video printer 18 (step S8). After the completion of the print, a print termination signal is sent from the video printer 18 to the system control unit 17, and further a signal is sent to the power supply unit 15 to turn off the supply of the power to each unit (step S9). Then the operation is terminated. If the cancel button 17c, rather than the print button 17b, is depressed at step S7, the operation proceeds to step S20 to be placed in a storing wait state, while if the cancel button 17c is not depressed, the operation proceeds to step S6 to be placed in a printing wait state (step S10). If there is any abnormality such as a shortage or jamming of paper at step S20, the inserted coin is repaid (step S21), in which a proper code, a place code and an accident code for the image processing system are sent from the communication unit 31 to the centralized supervisory system (FIG. 3) within the control center (step S22).

The control unit 41 of the centralized supervisory system, which has received the accident contents displays the proper code, the place name and the accident contents for the abnormal image processing system on the monitor 43. And the status content of the image processing system within the storage unit 42 is rewritten into a disenabled state to retrieve the nearest available image processing system. Based on a retrieved result, map data indicating the location of installed image processing system which has been prestored within the storage unit 42 is sent through the communication unit 40 to the image processing system which has caused the accident.

Figure 9:
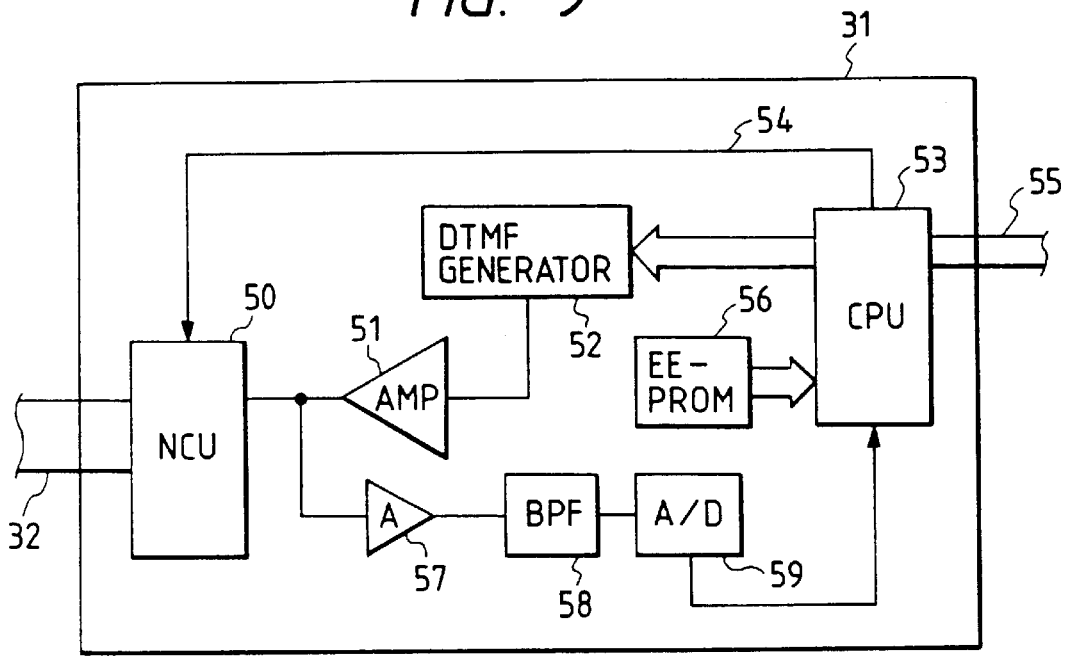
FIG. 9 is a specific circuit diagram of a communication unit 31 as shown in FIG. 5.

A schematic circuit configuration of the communication unit 31 is shown in FIG. 9. 55 is an accident informing control signal, in which if this signal is turned on, the CPU 53 turns on a line connection control signal 54 to instruct a network control unit (NCU) 50 to connect the line. Next, the CPU 53 reads a telephone number of the control center prewritten in a nonvolatile memory such as EEPROM 56, and instructs a DTMF generator 54 to output a DTMF (dual tone multi frequency) code corresponding to its number in sequence by the number in accordance with the specification of the line. If the line is connected to the control center, the centralized supervisory system automatically responds thereto so that a sinusoidal wave signal of 1 KHz is sent to the transmission side. A band pass filter (BPF) 58 of the communication unit 31 extracts the sinusoidal wave of 1 KHz, and an A/D converter 59 converts the detected level into the digital form. The CPU 53 judges that the line is connected to the control center if the digital value is equal to or more than a predetermined value, so that the proper code, the place code of installation, and the code of accident contents for the image processing system are read out in sequence from the EEPROM 56, and the DTMF code is sent along with an error correction code added at the last. If they are normally received in the control center, the centralized supervisory system generates a sinusoidal wave signal of 1 KHz to notify the transmission side of the normal reception. The communication unit 31 turns off the line if the 1 KHz signal is received. The centralized supervisory system displays a booth number, an installation place name, and the accident contents on the monitor 43 to be notified to the supervisor.

The communication unit 16 of the image processing system receives map data of the nearest available image processing system from the centralized supervisory system and stores them into the image storage unit 12 (step S23). The map is displayed on the monitor 14 (step S24), and if the print button of the operation unit 17 is depressed (step S25), it is checked whether or not there is any print sheet (step S26), where if there is any print sheet, the received data is printed (step S27). The control operation at steps S24 to S27 is continued if the image processing system is abnormal, and upon returning to the normal condition, the operation is reset to perform the control from step S1.

Note that the available image processing systems can be output with the expression of words.

In this way, as the system can inform the control center of the abnormality occurring in the image processing system, if any, the periodic round inspection for the image processing system can be dispensed with. As the maps for other available image processing systems can be displayed, the user can find out the available image processing system without searching about. As the coin is repaid even if any abnormality may occur during the control, there is no loss in spending the money.

Next, another example will be described.

FIG. 10 is a block diagram of an image processing system in another example of the present invention. 11 is a pick-up unit consisting of a video camera, 12 is an image storage unit constituted of a semiconductor memory, for example, capable of reading and writing the object information from the video camera 11, the image storage unit being capable of storing the 640 pixels in the x direction and the 480 pixels in the y direction. The read area for the print can be represented by a rectangle formed by S point (XS, YS) and E point (XE, YE) as the diagonal. XS, YS, XE, YE represent the addresses in the image storage unit, respectively. 13 to 19 are the same as in FIG. 1. 17d is a region shift button for shifting the print region in the image. By depressing the region button, XS, YS, XE, YE as above described will be increased or decreased. XS, YS, XE, YE are initialized when the power is turned on. XS, XE are incremented by one if the region shift button 17d of the right direction is depressed, while they are decremented by one if the region shift button 17d of the left direction is depressed. YS, YE are decremented by one if the region shift button 17d of the upper direction is depressed, while they are incremented by one if the region shift button 17d of the lower direction is depressed.

61 is a mark generator for generating a mark indicating the print region, in which along with that mark, the image is displayed on the monitor 14.

Figure 12:
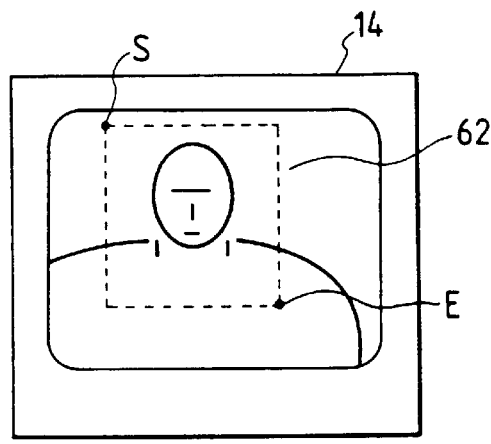
FIG. 12 is a view showing a mark indicating a print region displayed on a monitor 14.
Figure 11:
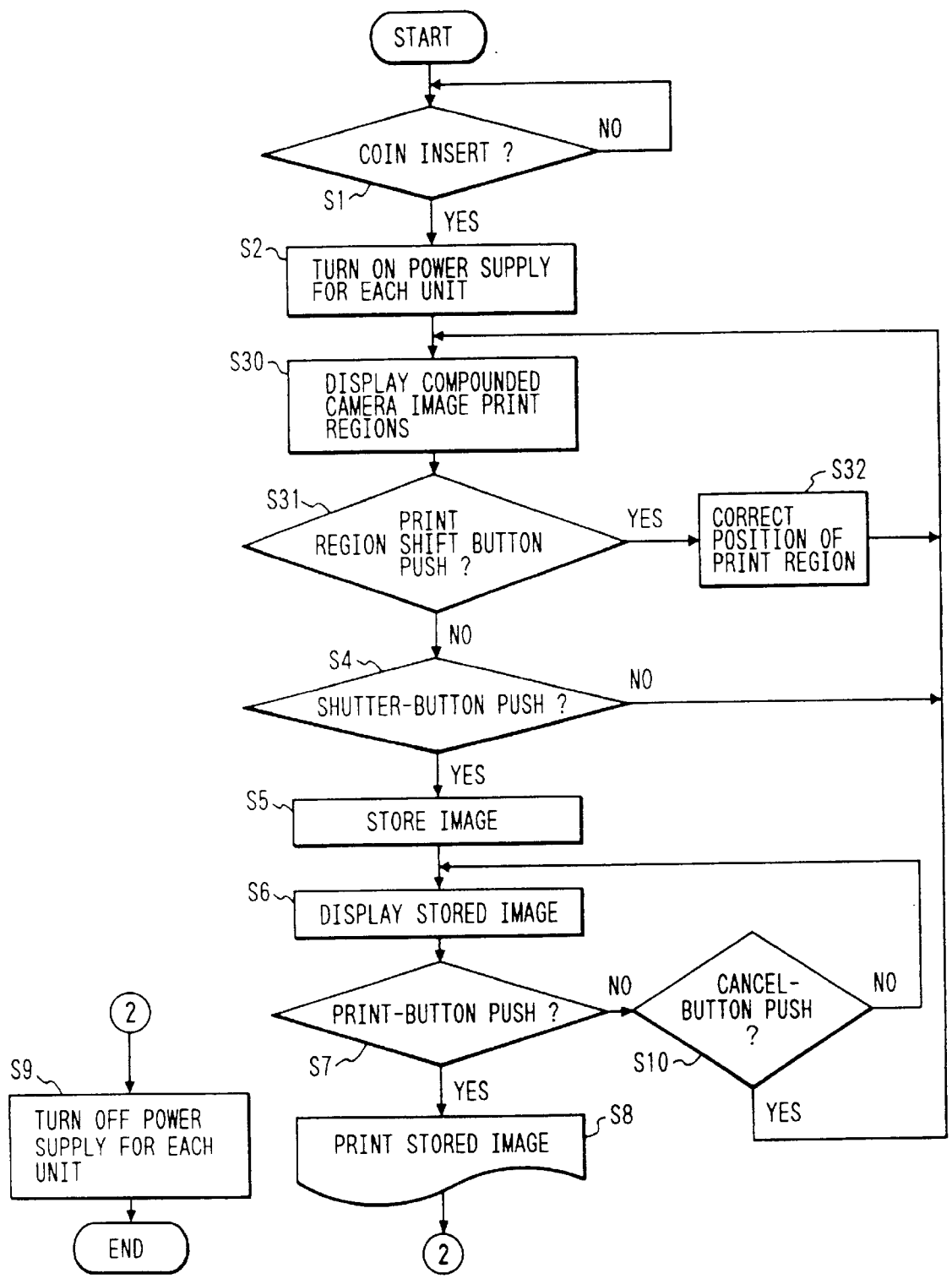
FIG. 11 is a flowchart of the operation in a system control unit 16 as shown in FIG. 10.

A flowchart of the operation in the system control unit 16 of an electronic photo system with the above configuration is shown in FIG. 11. If the coin detector 19 detects a coin, a coin insertion signal is sent to the control unit 16 (step S1). The system control unit 16 which has received the coin insertion signal sends a signal to the power supply unit 15 to start the supply of the electric power to each unit (step S2). If the supply of the electric power is started, the switch 13 is changed to the camera side to display a compounded image of an image being currently picked up with the video camera 11 and a mark 62 generated by the mark generator 61 on the monitor 14 (step S30). At this time, the mark generator receives data (XS, YS, XE, YE) representing the print region from the system control unit 16 as previously described, and generates the mark 62 indicating the region as shown in FIG. 12. The position of the mark at the start-up of the power supply can be determined by the initial value which the ROM of the system control unit 16 has stored. The photographer shifts the mark 62 to a position of preferred picture composition by operating the region shift button 17d while seeing the monitor 14. If the region shift button 17d is depressed (step S31), the system control unit 16 increments or decrements the position data (XS, YS, XE, YE) in accordance with its direction and amount (step S32). The data changed at step S32 is sent to the mark generator 61 to generate the mark in accordance with its data, and the operation proceeds to step S30, where a compounded image of an image being currently picked up with the video camera 11 and a mark 62 generated by the mark generator 61 is displayed on the monitor 14. If the region shift button 17d is not depressed at step S31, the operation proceeds to the next step. If the shutter button 17a of the operation unit 17 is depressed (step S4), the image being picked up at that time is stored in the image storage unit 12 (step S5). Then the switch 13 is changed to the storage unit side, and the stored image is displayed on the monitor 14 to allow the photographer to confirm the image to be printed (step S6). If the print button 17b of the operation unit 17 is depressed (step S7), the image within the print region is printed (step S8).

Figure 13:
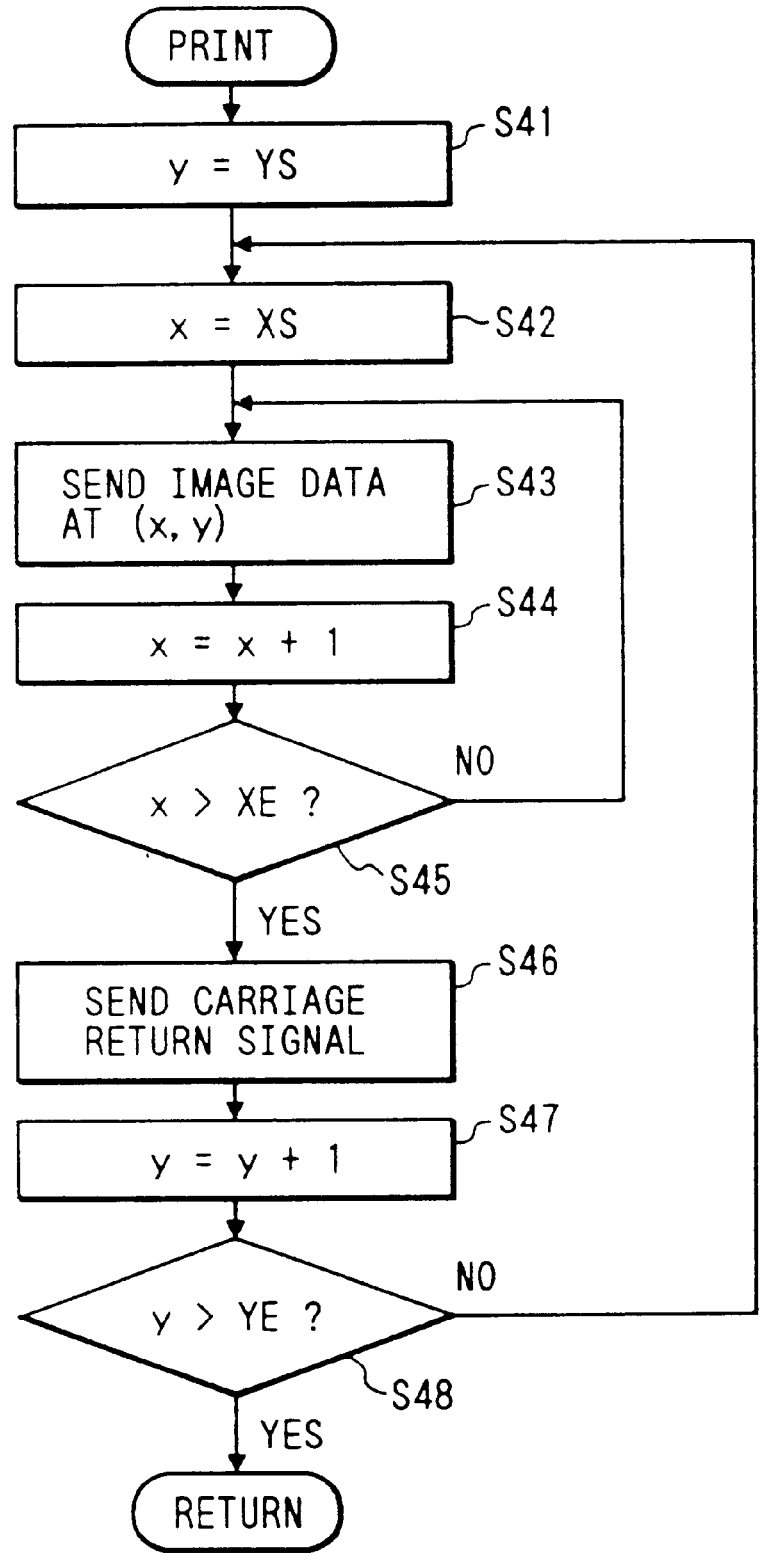
FIG. 13 is a flowchart of the printing as shown in FIG. 10.
Figure 14:
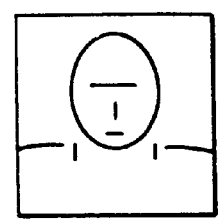
FIG. 14 is a view showing a result printed with a region specification as shown in FIG. 12.

The print at step S8 will be described in detail with reference to FIG. 13. x, y represents the address for reading the image data from the image storage unit 12. To begin with, x is set to XS and y is set to YS (steps S41, S42). Next, the image data at the address (x,y) is sent to the video printer 18 and printed (step S43). And x is incremented by one (step S44), and it is checked whether or not x>XE is true (step S45). If x≦XE at step S45, the operation proceeds to step S43 to increment x. If x>XE, a line feed signal is sent to the video printer 18 (step S46) to increment y by one (step S47). And it is checked whether or not y>YE is true (step S48). If y≦YE at step S48, the operation proceeds to step S41, where x is reset to XS, and the print operation is continued. If y>YE, a print termination signal is sent to the video printer 18 to terminate the print. As a result of the print, the image as shown in FIG. 14 can be obtained.

After the completion of the print, a print termination signal is sent from the video printer 18 to the system control unit 17, and further a signal is sent to the power supply unit 15 to turn off the supply of the power to each unit (step S9). Then the operation is terminated. If the cancel button 17c, rather than the print button 17b, is depressed at step S7, the operation proceeds to step S30, where a compounded image of the image from the video camera 11 and the mark 62 is displayed, while if the cancel button 17c is not depressed, the operation proceeds to step S6 to be placed in a printing wait state (step S10).

It should be noted that the picture composition can be confirmed with a simple configuration in which a fixed mark indicating the print region of respective print size is displayed on the screen of the monitor 14, without using the mark generator 61 and the region movement button 17d, and with the position data of print region fixed.

It will be appreciated that a photograph can be taken in a correct attitude in such a way that if the shutter button 17a of the operation unit 17 is depressed in photographing, the image being currently picked up is stored under the control of the system control unit 16 when a predetermined count value is reached by counting up with a counter contained within the system control unit 16.

It is also possible to change the print size by inputting the size data in addition to the position data of the print region.

In this way, as the user can confirm the photographed result before the picture is printed, a more favorable picture can be obtained while eliminating the wastes of photographing fee or print sheet. Furthermore, as a movable print region mark is displayed on the monitor, the composition of picture can be confirmed so as to be changed without moving the picture.

Next, another example of the present invention will be described.

Figure 15:
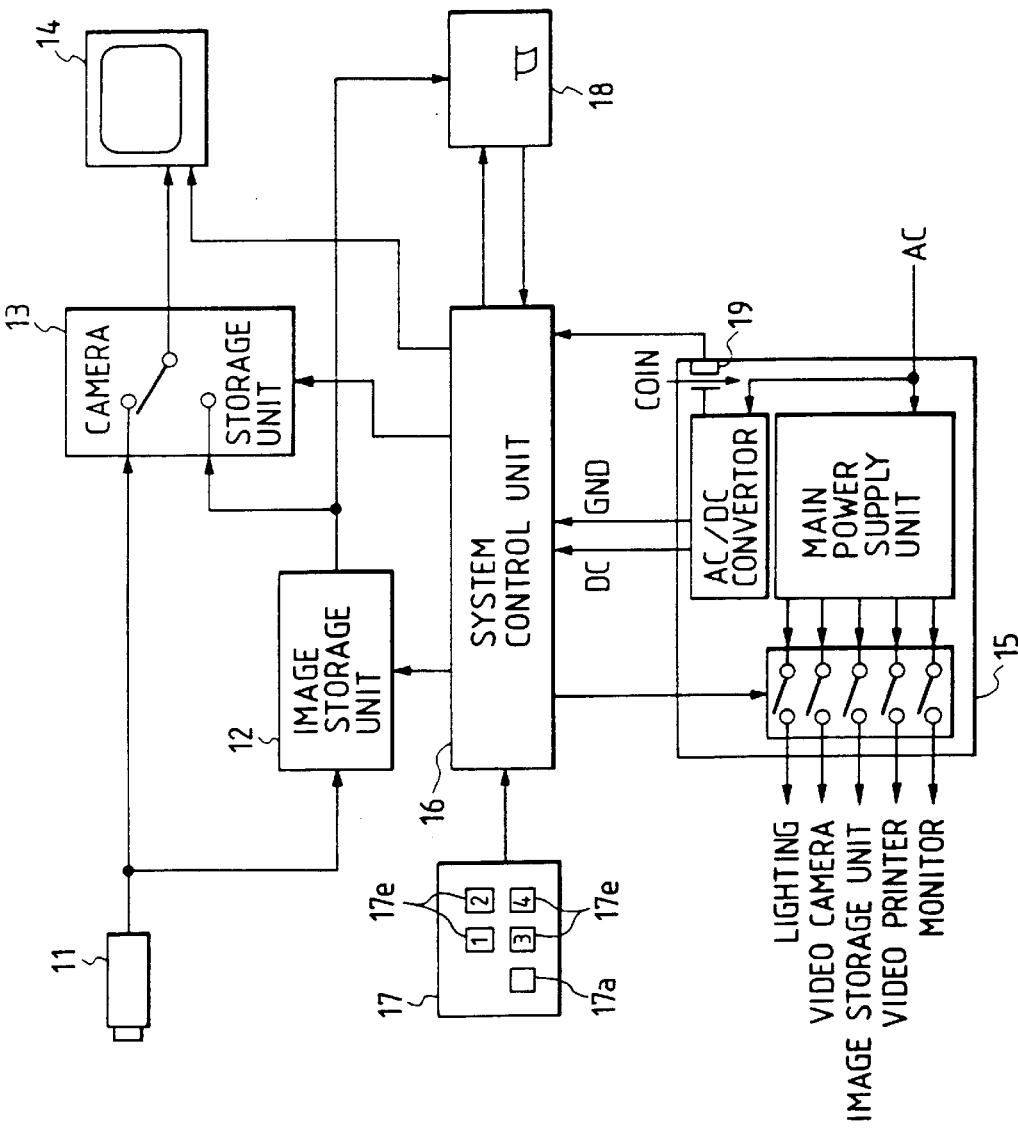
FIG. 15 is a block diagram of an image processing system in another example.

FIG. 15 is a block diagram of an electronic photo system in one example of the present invention. 11 is an image pick-up unit consisting of a video camera, and 12 is an image storage unit constituted of a semiconductor memory, for example, for storing the image information from the video camera 11. 13 is a monitor output screen changeover switch, 14 is a monitor, and 15 is a power supply unit for supplying the power to each unit. 16 is a system control unit for controlling the operation of each unit, which is constituted of CPU, RAM, and ROM (not shown). The RAM is used as a work area for the CPU, and the ROM has written the contents of control operation or the message data for displaying on the monitor. 17 is an operation unit for operating the system control unit 16, comprising a shutter button 17a for starting the storage of image, and a print image select button 17e for specifying a stored image to be printed among four stored images which have been stored in the image storage unit 12. 18 is a video printer such as a thermal printer, or a bubble jet printer for discharging the ink by the use of the pressure of bubbles generated by the heat. 19 is a detector for detecting the input of a coin.

Figure 17:
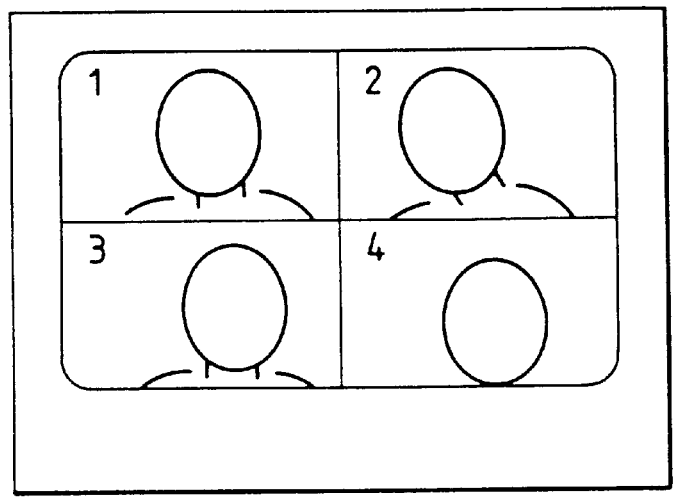
FIG. 17 is a view showing a display screen on a monitor 14.
Figure 16:
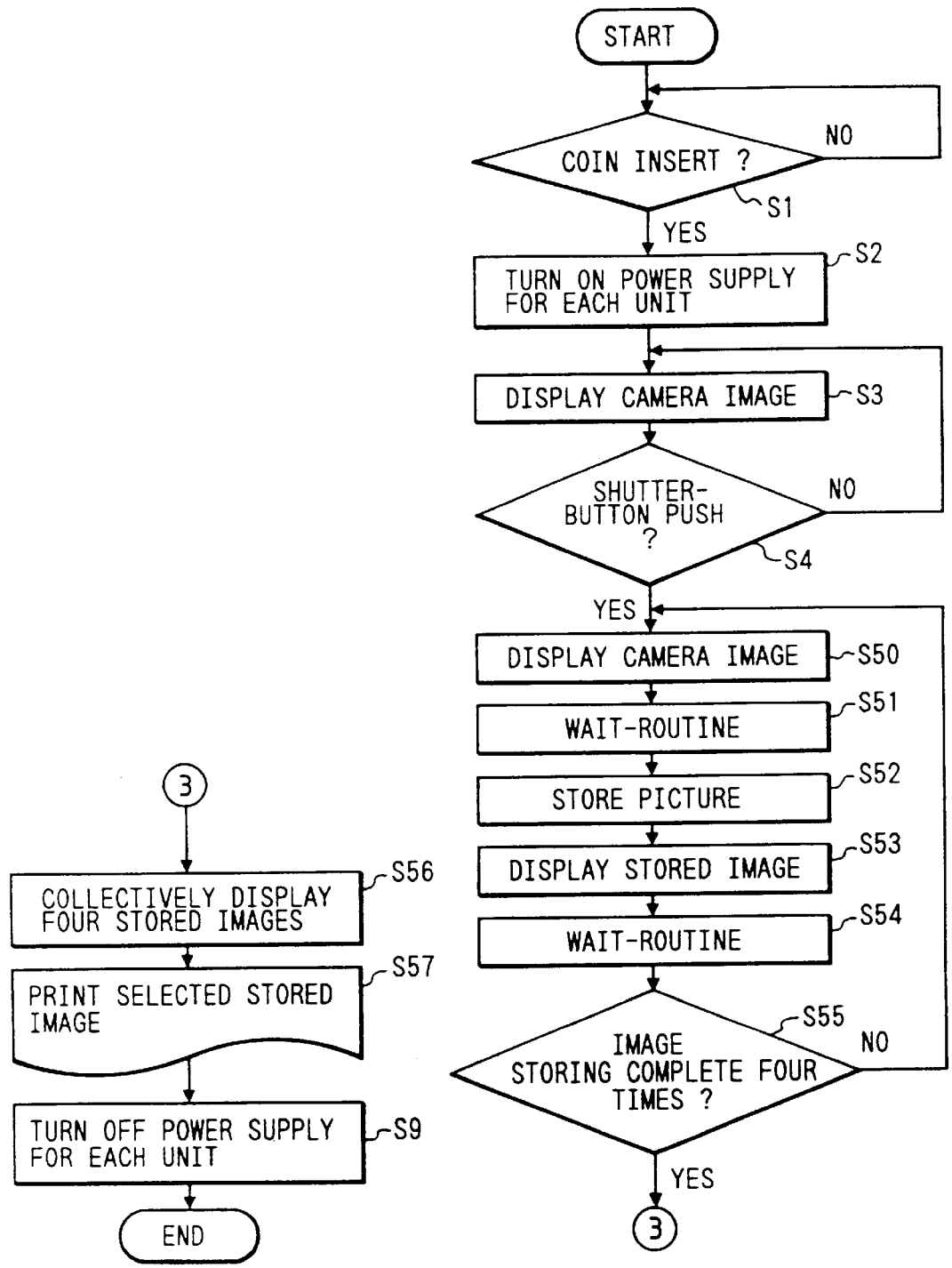
FIG. 16 is a flowchart of the operation in a system control unit 16 as shown in FIG. 15.

A flowchart of the operation in the system control unit 16 of the electronic photo system having the above configuration is shown in FIG. 16. If the coin detector 19 detects a coin, a coin insertion signal is sent to the system control unit 16 (step S1). The system control unit 16 which has received the coin insertion signal sends a signal to the power supply unit 15 to start the supply of the electric power to each unit (step S2). Next, the switch 13 is changed to the camera side to display an image being currently picked up by the video camera 11 directly on the monitor 14 (step S3). If the shutter button 17a of the operation unit 17 is depressed (step S4), the image being picked up by the video camera 11 is displayed for a predetermined time (steps S50, S51), and the picked up image is stored into the image storage unit 12 (step S52). Next, the switch 13 is changed to the storage unit side to cause the stored image to be displayed on the monitor 14 for a predetermined time, so that the photographer can confirm the image (steps S53, S54). The count-up is made every time the system control unit 16 stores the image, in which it is checked whether or not the count-up has been made four times, or four images have been stored (step S55). At step S55, the counter is below four, the operation proceeds to step S50 to store the image, while if the counter is equal to 4, the monitor is divided into four display sections as shown in FIG. 17 to display collectively four images stored in the image storage unit 12 on the monitor (step S56). By seeing a collectively displayed monitor screen, the photographer selects the image to be printed and then depresses the print image select button 17b of the operation unit 17. If the print image select button 17b is depressed to specify the image to be printed, its specified image is printed (step S57). After the completion of the print, a print termination signal is sent from the video printer 18 to the system control unit 17. The system control unit 17 which has received the print termination signal sends a signal to the power supply unit 15 to turn off the supply of the power to each unit (step S9). Then the operation is terminated.

The image storage unit 12 can store four images in this example, but the present invention is not limited to four images. It may be sufficient to store a plurality of images.

It will be appreciated that the print image can be specified by depressing the print button while the stored image is being displayed in a repetitive operation of image pick-up, storage and display in series.

In this way, by storing a picked-up image of the camera and displaying the stored image in succession, the user can correct for his pose to be more excellent. Furthermore, as a plurality of images are stored and collectively displayed, and the image specified by the user is printed, the user can select a more favorable picture by the comparison between a plurality of images while eliminating the wastes of photographing fee or print sheet.

Next, another example of the present invention will be described below.

Figure 18:
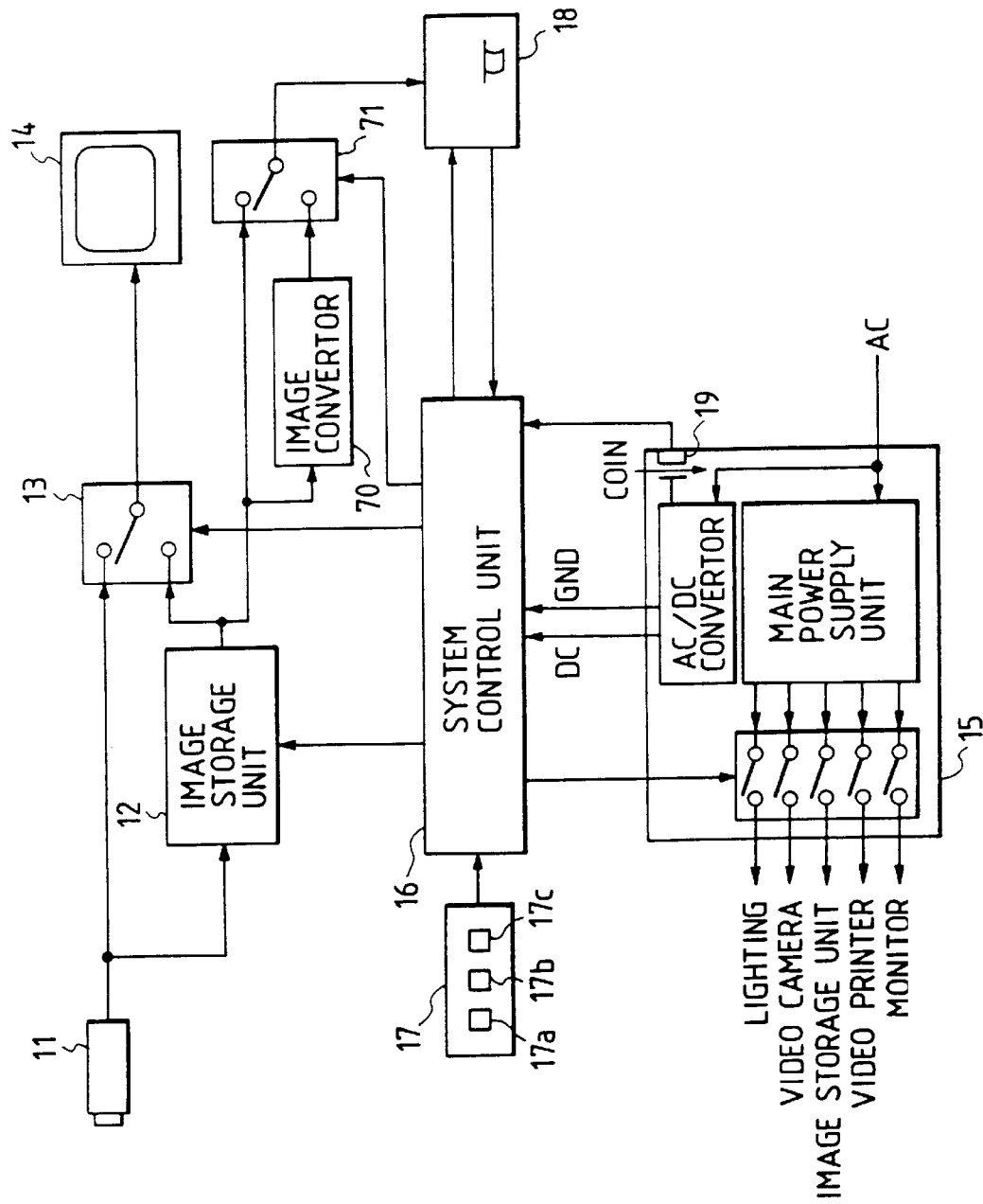
FIG. 18 is a block diagram of an image processing system in another example.

FIG. 18 is a block diagram of an image processing system in another example of the present invention. 11 is a video camera (for picking up a color image and outputting a color image signal), 12 is an image storage unit constituted of a semiconductor memory, for example, for storing the image information from the video camera 11, 13 is a monitor output screen changeover switch, 14 is a monitor, and 15 is a power supply unit for supplying the power to each unit. 16 is a system control unit for controlling the operation of each unit, which is constituted of CPU, RAM, and ROM (not shown). The RAM is used as a work area for the CPU, and the ROM has written the contents of control operation or the message data to be displayed on the monitor. 17 is an operation unit for operating the system control unit 16, comprising a shutter button 17a for starting the storage of image, a print button 17b for starting the print of stored image, a cancel button 17c for canceling the stored image to reset the system to a photographing wait state, and a white-and-black/color select button 17f for selecting the white-and-black print or the color print. 18 is a video printer such as a thermal printer, or a bubble jet printer for discharging the ink by the use of the pressure of bubbles generated by the heat. 19 is a detector for detecting the input of a coin.

70 is an image convertor for converting the color image information read out from the image storage unit 12 into the white-and-black image information, and 71 is a print image changeover switch for changing the video printer 18 to print the color or white-and-black image.

Figure 19:
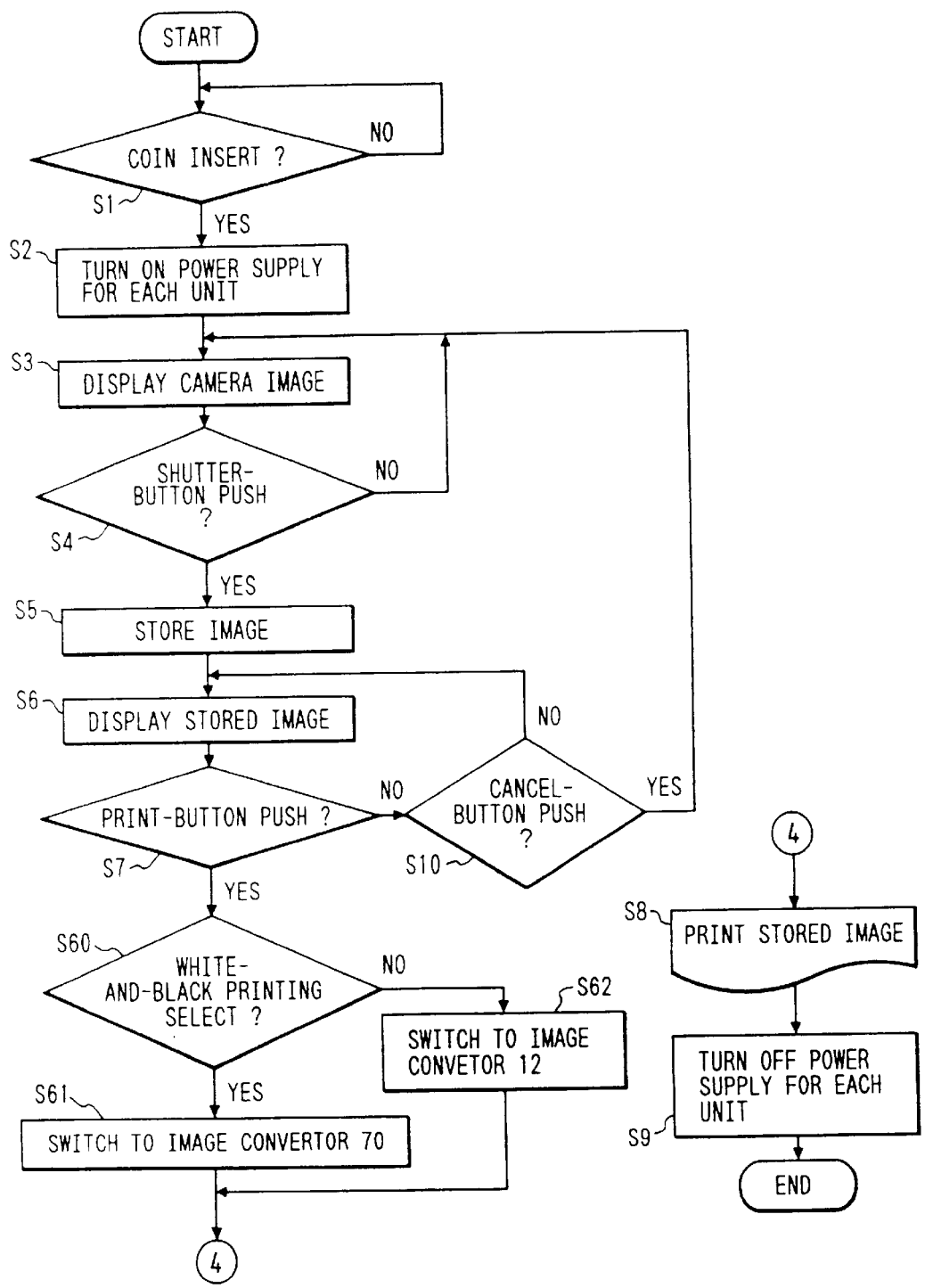
FIG. 19 is a flowchart of the operation in a system control unit 16 as shown in FIG. 18.
Figure 23:
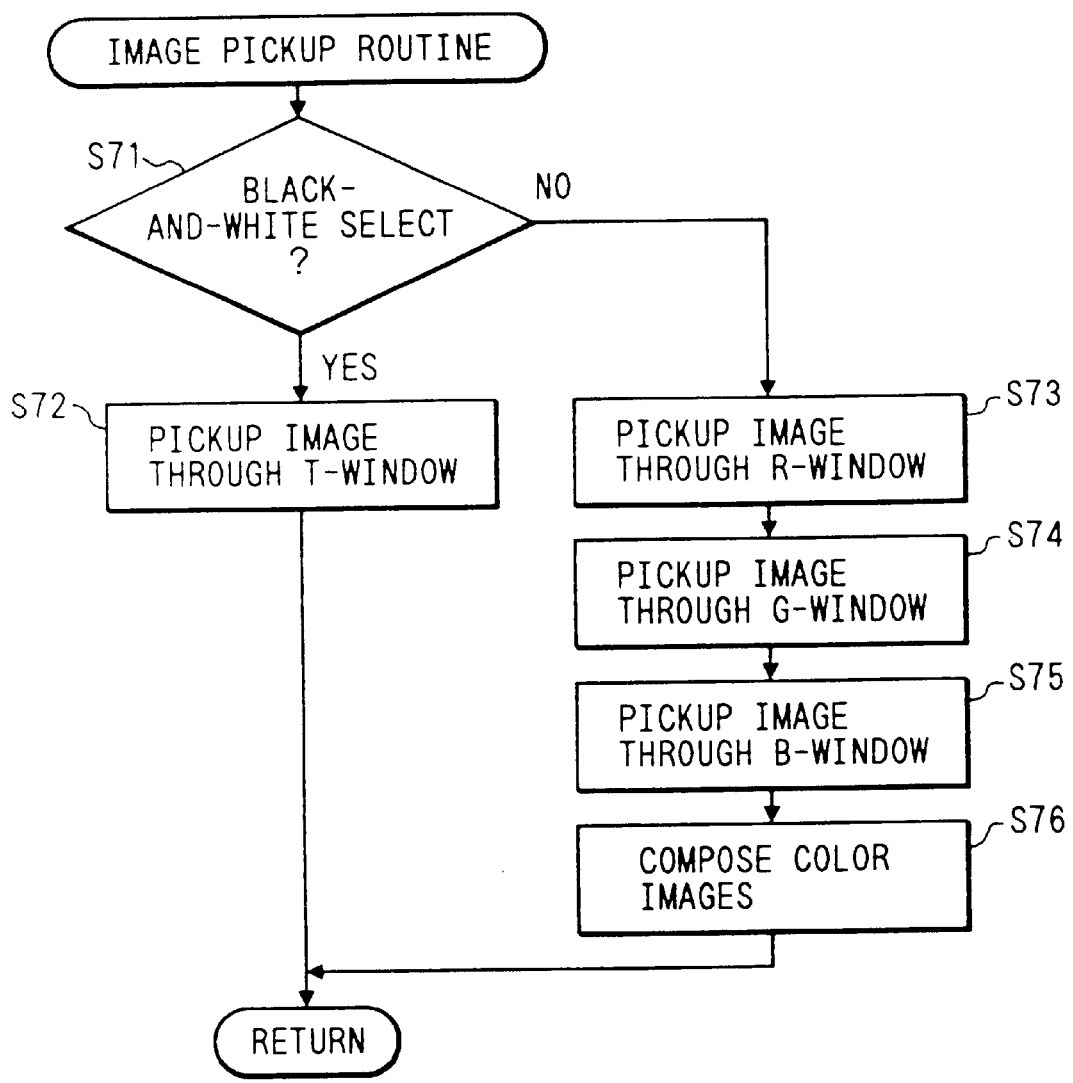
FIG. 23 is a flowchart of the image pick-up as shown in FIG. 21.
Figure 24:
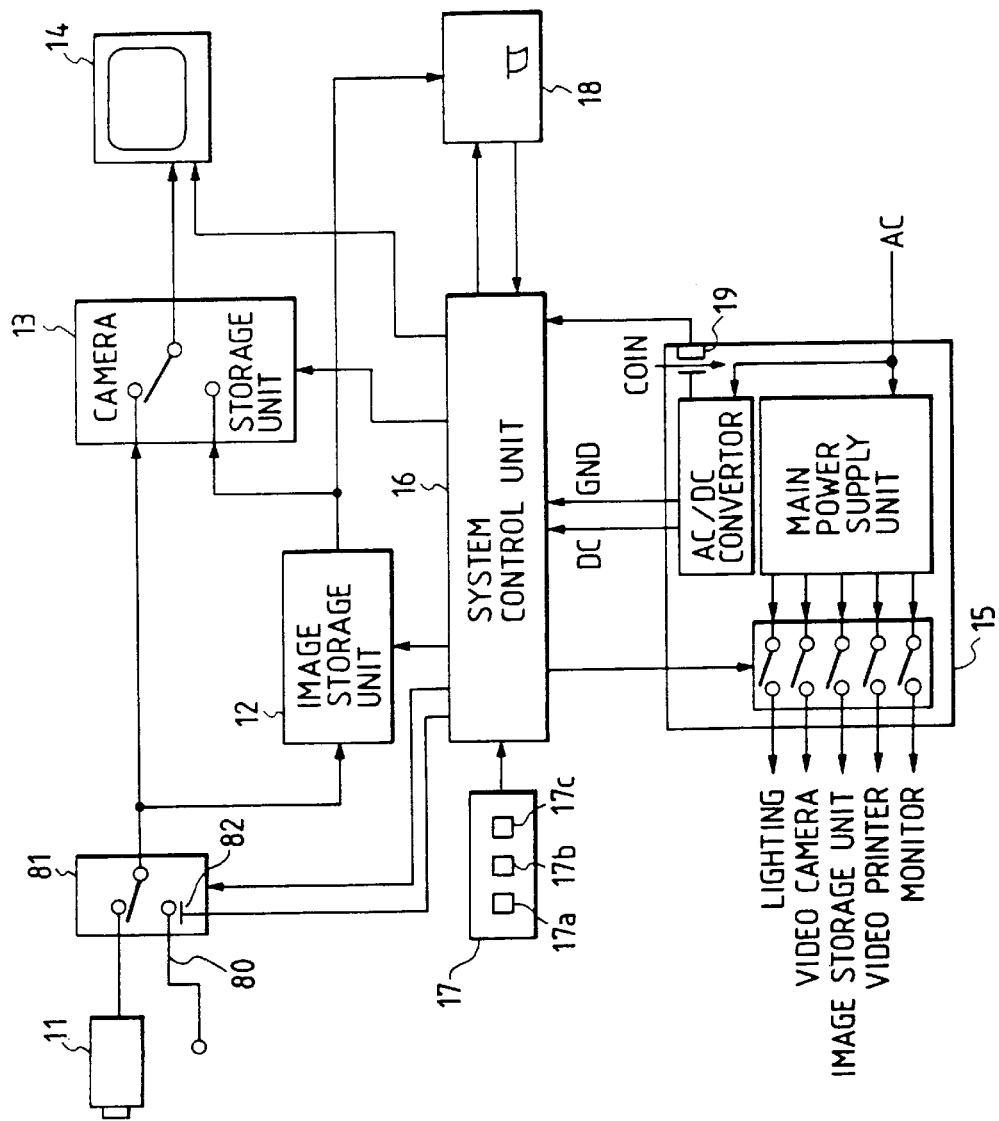
FIG. 24 is a block diagram of an image processing system in another example.

A flowchart of the operation in the system control unit 16 of an electronic photo system having the above configuration is shown in FIG. 19. If the coin detector 19 detects a coin, a coin insertion signal is sent to the system control unit 16 (step S1). The system control unit 16 which has received the coin insertion signal sends a signal to the power supply unit 15 which starts the supply of the electric power to each unit (step S2). Next, the switch 13 is changed to the camera side to display an image being currently picked up by the video camera 11 directly on the monitor 14 (step S3). If the shutter button 17a of the operation unit 17 is depressed (step S4), the image being picked up at that time is stored as a still image into the image storage unit 12 (step S5).

Next, the switch 13 is changed to the storage unit side to cause the stored image to be displayed on the monitor 14, so that the photographer can confirm the image to be printed (step S6). If the print button 17b of the operation unit 17 is depressed, a determination is made whether the instruction is for a white-and-black print or color print (step S60). If the white-and-black is selected with the white-and-black/color select button 17f, the system control unit 16 changes the print image changeover switch 71 to the side of the image converter 70, which converts the color image information from the image storage unit 12 into the white-and-black image information which is then output to the video printer 18 (step S61). If the color is selected with the white-and-black/color select button 17f at step S60, the system control unit 16 changes the print image changeover switch 71 to the opposite side of the image converter 70, so that the image storage unit 12 and the video printer 18 are directly connected, whereby the color image information from the image storage unit 12 is directly output to the video printer 18 (step S62). Based on the image information sent therein, the color or white-and-black image is printed with the video printer 18 (step S8).

After the completion of the print, a print termination signal is sent from the video printer 18 to the system control unit 17, and further a signal is sent to the power supply unit 15 to turn off the supply of the power to each unit (step S9). Then the operation is terminated. If the cancel button 17c, rather than the print button 17b, is depressed at step S7, the operation proceeds to step S3 to be placed in a storing wait state, while if the cancel button 17c is not depressed, the operation proceeds to step S6 to be placed in a printing wait state (step S10).

FIG. 20 is a block diagram of an improved system of FIG. 18. A different point from FIG. 18 is that the image converter 70 and the print image changeover switch 71 are connected at the front stage of the switch 13. Thus, if the white-and-black is selected with the white-and-black/color select button 17f, the white-and-black image is displayed on the monitor 14, while if the color is selected, the color image is displayed on the monitor 14. Hence, both the color and white-and-black images can be printed to allow the user to obtain a picture in accordance with his desire. Further, the white-and-black or color image to be printed can be confirmed on the monitor.

Next, another example of the present invention will be described below.

Figure 22:
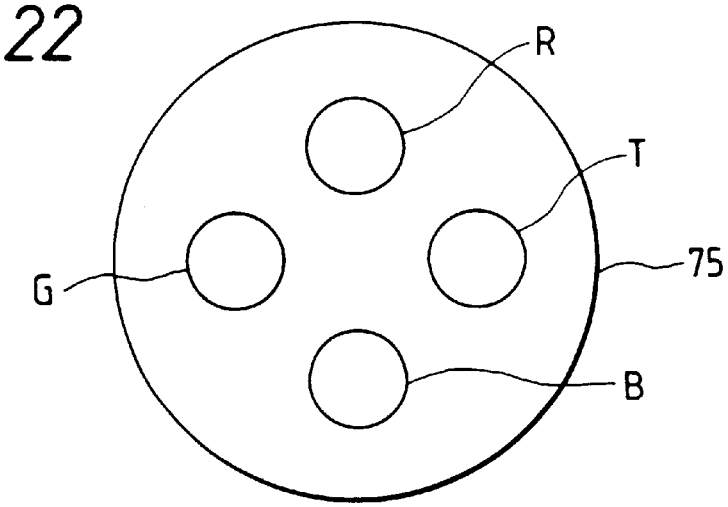
FIG. 22 is a configuration view of a rotation filter 75 as shown in FIG. 21.

FIG. 21 is a block diagram of an image processing system in another example of the present invention. 11 is a monochrome video camera which issues a synchronizing signal in synchronism with the read out of an image. 12 to 19 are the same as in FIG. 1. 75 is a rotation filter, 76 is a motor control unit, and 77 is a stepping motor. FIG. 22 shows a profile of the rotation filter.

R, G and B are windows having red, green and blue transmission filters mounted, respectively, and T is an achromatic transparent window. The video camera 11 picks up an image through those windows.

With such a configuration, if the white-and-black is selected with the white-and-black/color select button on the operation unit 17, the system control unit 16 outputs a signal indicating its selection to the motor control unit 76, which controls the driving of the motor 77 so that the T window of the rotation filter 75 is positioned in front of the video camera 11, in which the image is picked up through the T window with the rotation filter held in its state (steps S71, S72). On the other hand, if the color is selected with the white-and-color select button on the operation unit 17, the system control unit 16 outputs a signal indicating its selection to the motor control unit 76. The motor control unit 76 controls the driving of the motor 77 in synchronism with the synchronizing signal output from the video camera 11, so that R, G and B windows of the rotation filter are positioned in front of the video camera 11 in sequence. As a result, the image passing through the R, G and B filters from the video camera 11 is read out in sequence (steps S73, S74, S75), in which the system control unit 16 operates on the color image information by composing the color images passing through respective filters to obtain a color image. Thereby, the white-and-black and color image can be printed to provide a picture in accordance with a desire of the user. As the white-and-black video camera is used, a low cost image processing system can be implemented.

Another example of the present invention will be described below.

Figure 25:
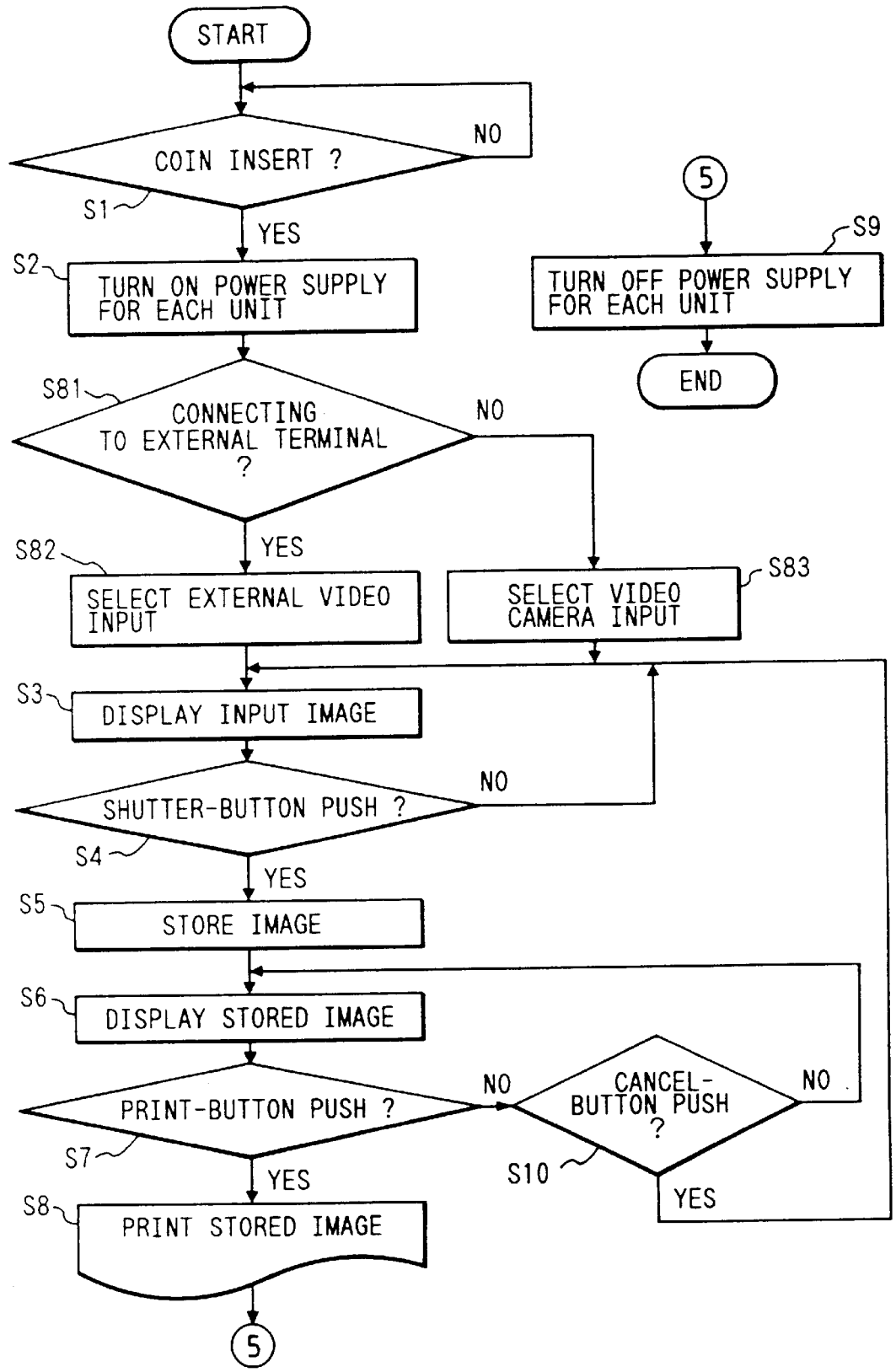
FIG. 25 is a flowchart of the operation in a system control unit 16 as shown in FIG. 24.

FIG. 25 is a block diagram showing another example of the present invention. 11 is an image pick-up unit consisting of a video camera, 80 is an external video input terminal, 81 is a video input select changeover switch, 82 is an external input terminal connection detector unit, 12 is an image storage unit constituted of a semiconductor memory, for example, for storing the information of an object from the video camera 11, 13 is a monitor output screen changeover switch, 14 is a monitor, 15 is a power supply unit for supplying the electric power to each unit, 16 is a system control unit for controlling the operation of each unit, 17 is an operation unit for operating the system control unit 16, 18 is a video printer which is a print output unit, and 19 is a detector for detecting the input of a coin.

A flowchart of the operation in the system control unit 16 of an electronic photo system having the above configuration is shown in FIG. 25. If the coin detector 19 detects a coin, a coin insertion signal is sent to the system control unit 16 (step S1). The system control unit 16 which has received the coin insertion signal sends a signal to the power supply unit 15 to start the supply of the electric power to each unit (step S2). Next, the external terminal connection detector unit 22 detects whether or not the video input is connected to the external video input terminal. If the external terminal is connected (step S81), the video input select changeover switch 81 is changed to the side of the external video input terminal 80 to input an image signal from the external video input terminal 80 (step S82). If the external terminal is not connected at step S81, the video input select changeover switch 81 is changed to the side of the video camera 11 to input an image signal from the video camera 11 (step S83). And the input image selected at steps S81 to S83 is displayed (step S3). If the shutter button 17a of the operation unit 17 is depressed (step S4), the image being picked up at that time is stored as a still image into the image storage unit 12 (step S5).

Next, the switch 13 is changed to the storage unit side to cause the stored image to be displayed on the monitor 14 so that the photographer can confirm the image to be printed (step S6). If the print button 17b of the operation unit 17 is depressed (step S7), the stored image is printed by the video printer 18 (step S8). After the completion of the print, a print termination signal is sent from the video printer 18 to the system control unit 17, and further a signal is sent to the power supply unit 15 to turn off the supply of the power to each unit (step S9). Then the operation is terminated. If the cancel button 17c, rather than the print button 17b, is depressed at step S7, the operation proceeds to step S3 to be placed in a storing wait state, while if the cancel button 17c is not depressed, the operation proceeds to step S6 to be placed in a printing wait state (step S10).

Figure 26:
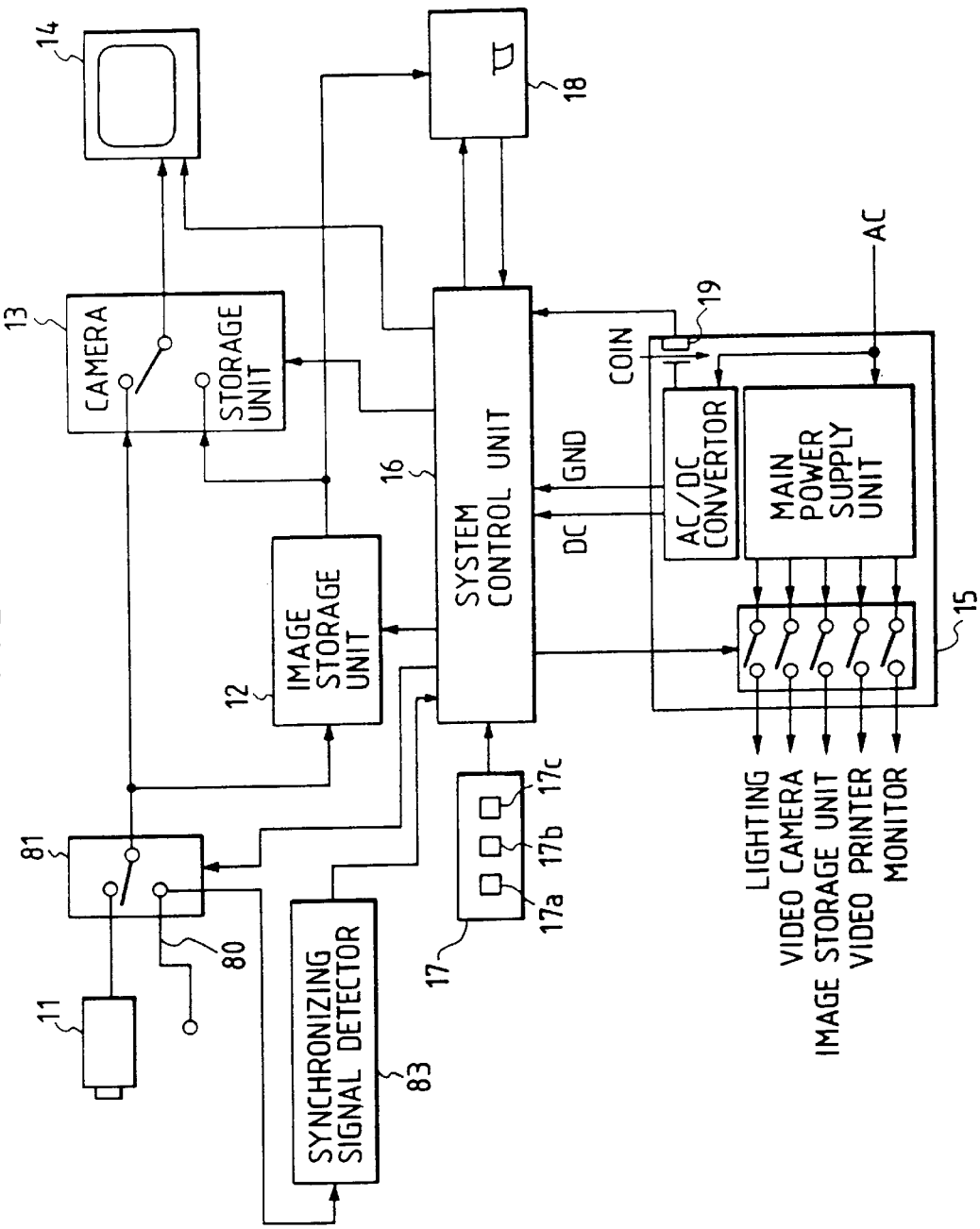
FIG. 26 is a block diagram of an image processing system in another embodiment.

It will be appreciated that as shown in FIG. 26, by providing a synchronizing signal detector to issue a detection signal if it detects a synchronizing signal for the input video signal at the external video input terminal 80, the system control unit 16 can control the video input select switch 81 to be changed to the side of the external video input terminal 80 upon receiving the detection signal from the synchronizing signal detector 83.

It will be also appreciated that the image recorded on a video tape can be printed by providing a video tape deck, instead of the external video input terminal 80.

In this way, since images other than those picked up by a photo booth system can be printed, the utilization range for the user can be extended.

Figure 27:
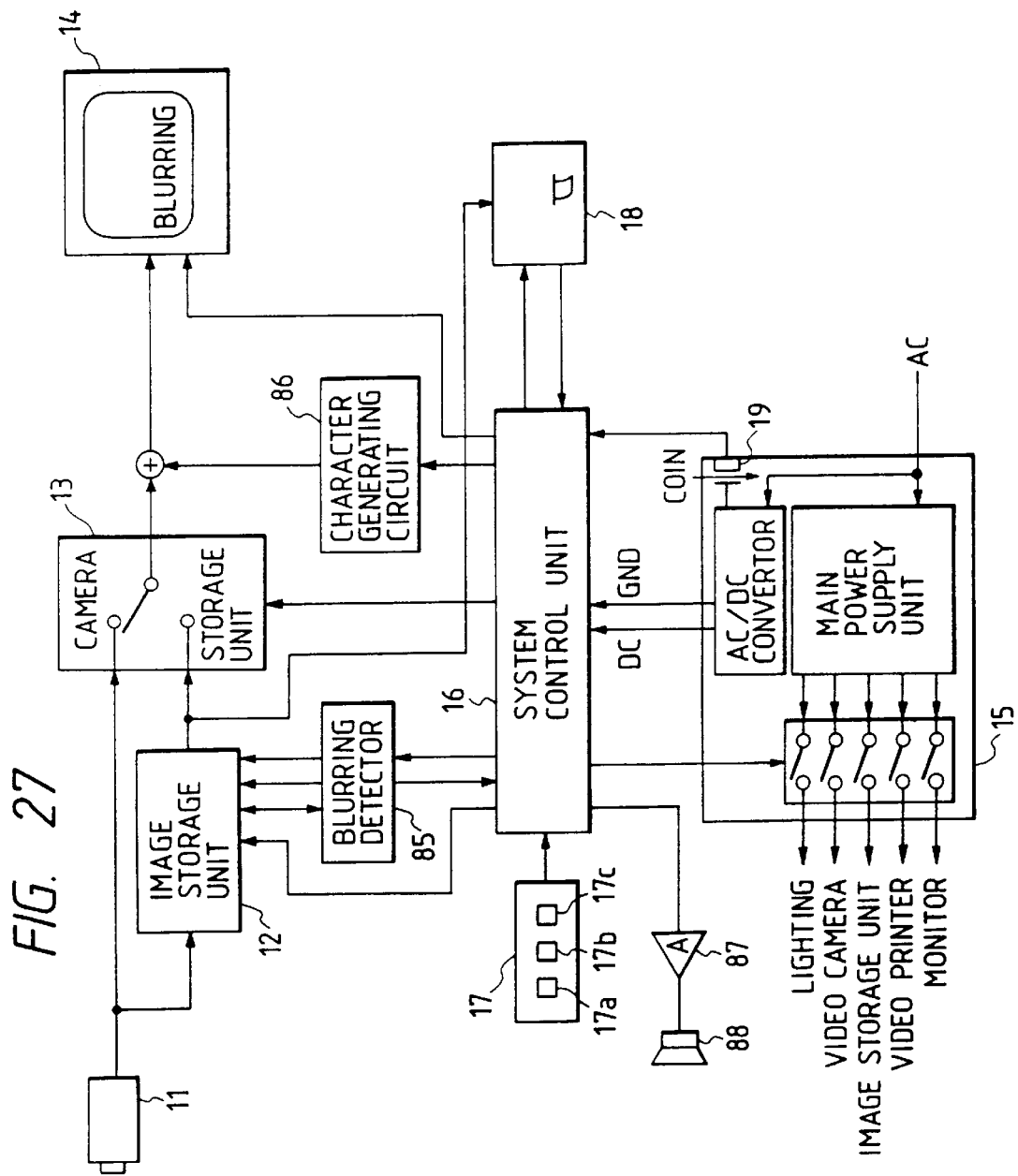
FIG. 27 is a block diagram of an image processing system in another embodiment.

Next, another example of the present invention will be described below. FIG. 27 is a block diagram of an image processing system in another example of the present invention. 11 to 19 are the same as in FIG. 1. 85 is a decision circuit for deciding whether or not the image stored in the image storage unit 12 is blurred, 86 is a character generating circuit for generating the character for use in displaying a message on the monitor 14, 87 is a signal amplifier for amplifying a voice signal for the message output from the system control unit 16, and 88 is a speaker for outputting the voice signal amplified by the signal amplifier as the voice.

Referring now to FIGS. 28 to 32, a detection method with the blurring detector 85 will be described below. The system control unit 16 performs the control so that if the shutter button 17a is depressed, the image from the video camera 11 at the times t1, t2 are stored in a first field A and a second field B of the image storage unit 12, respectively.

Figure 28:
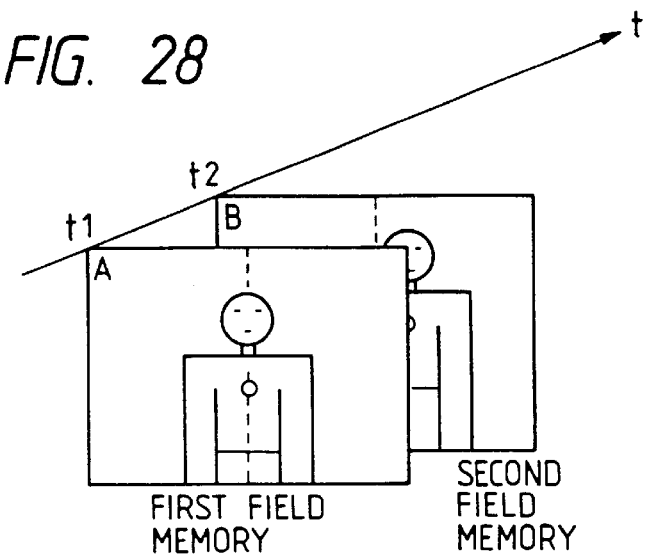
FIG. 28 is a view showing the movement of an image in the time direction.
Figure 29:
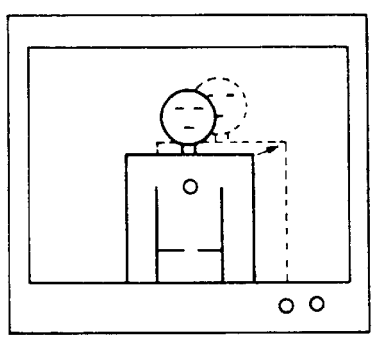
FIG. 29 is a view showing a blurred image displayed on the monitor 14.
Figure 30:
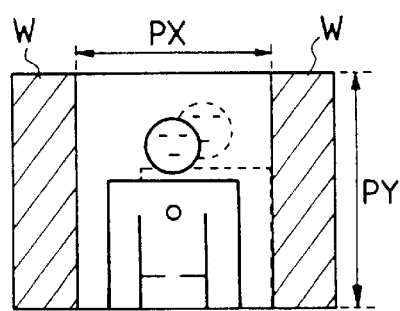
FIG. 30 is a view showing the blurred image printed by a printer 18.

If the shutter button 17a is depressed while an object is moving right upward, the image stored in the second field memory is equal to an image to which the object of the image stored in the first field memory has moved right upward, as shown in FIG. 28. Here, if the image stored in the image storage unit 12 is directly output to the monitor 14, a blurred image is displayed as shown in FIG. 29. If the image stored in the image storage unit 12 is output to the printer 18, the blurred image is also printed as shown in FIG. 30.

Figure 31:
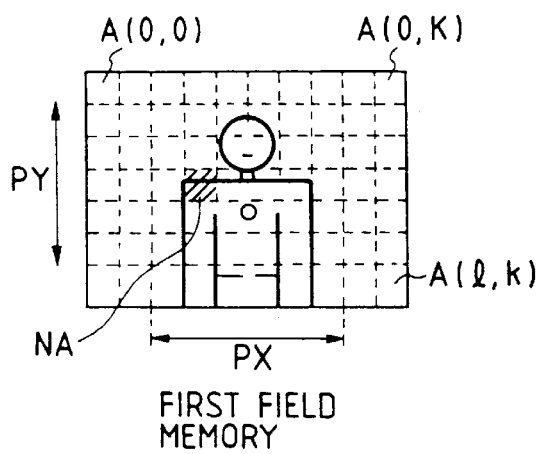
FIG. 31 is a view showing the image stored in a first field of image storage unit 12.
Figure 32:
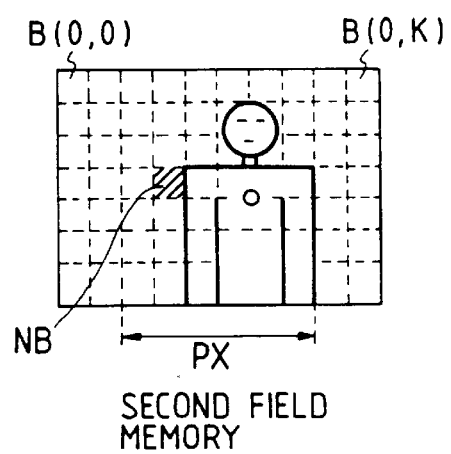
FIG. 32 is a view showing the image stored in a second field of image storage unit 12.

Since the print of blurred image is not useful, as shown, a determination is made whether or not the blurred image may be printed by detecting the movement vector based on the images stored in the first and second field memories. First, a block composed of m=n×n pixels is set in the image of the first and second fields A and B as shown in FIGS. 31 and 32. The value representing the correlation between the block of interest A and the block of interest B can be obtained from the values of pixel Ai within a block of interest A in the first field A and the values of pixel Bi within a block of interest B in the second field B, by using the following expression (see Japanese Patent Publication Gazette No. 2-52914).

$$C = \sum_{1}^{m} |Ai - Bi|$$

Note that $$\sum_{i=1}^{m} x_i = x_1 + x_2 + x_3 + \ldots x_{m-1} + x_m$$

With the above expression, the correlation value C between the block of interest A, and the block of interest B at the position corresponding to the block of interest A with the eight blocks around the block of interest B can be obtained for each block, in which the position of the block having the least correlation value C is stored, and it is decided that the blurring occurred in photographing if the correlation value C between the blocks other than the block of interest among the nine blocks in the second field and the block of interest A is least, whereby a blurring detection signal is output to the system control unit 16. Also, when the correlation value C between the block of interest B and the block of interest A is least, the correlation value C and a preset constant value $C_B$ are compared, in which if $C>C_B$, the blurring detection signal is output to the system control unit 16. The operation of detecting the blurring by obtaining the correlation value C between the block of interest A and each block among the nine blocks in the second field is performed for all blocks in the first field by changing the block of interest A from A(0, 0) block to A(1,k) block.

Note that it is possible to shorten the calculation time by limiting the block to be operated for detecting the movement vector only to the print range of printer. On the contrary, the unwasteful printing is enabled by aligning the print range with an integral multiple of the operation block for the movement vector.

Figure 33:
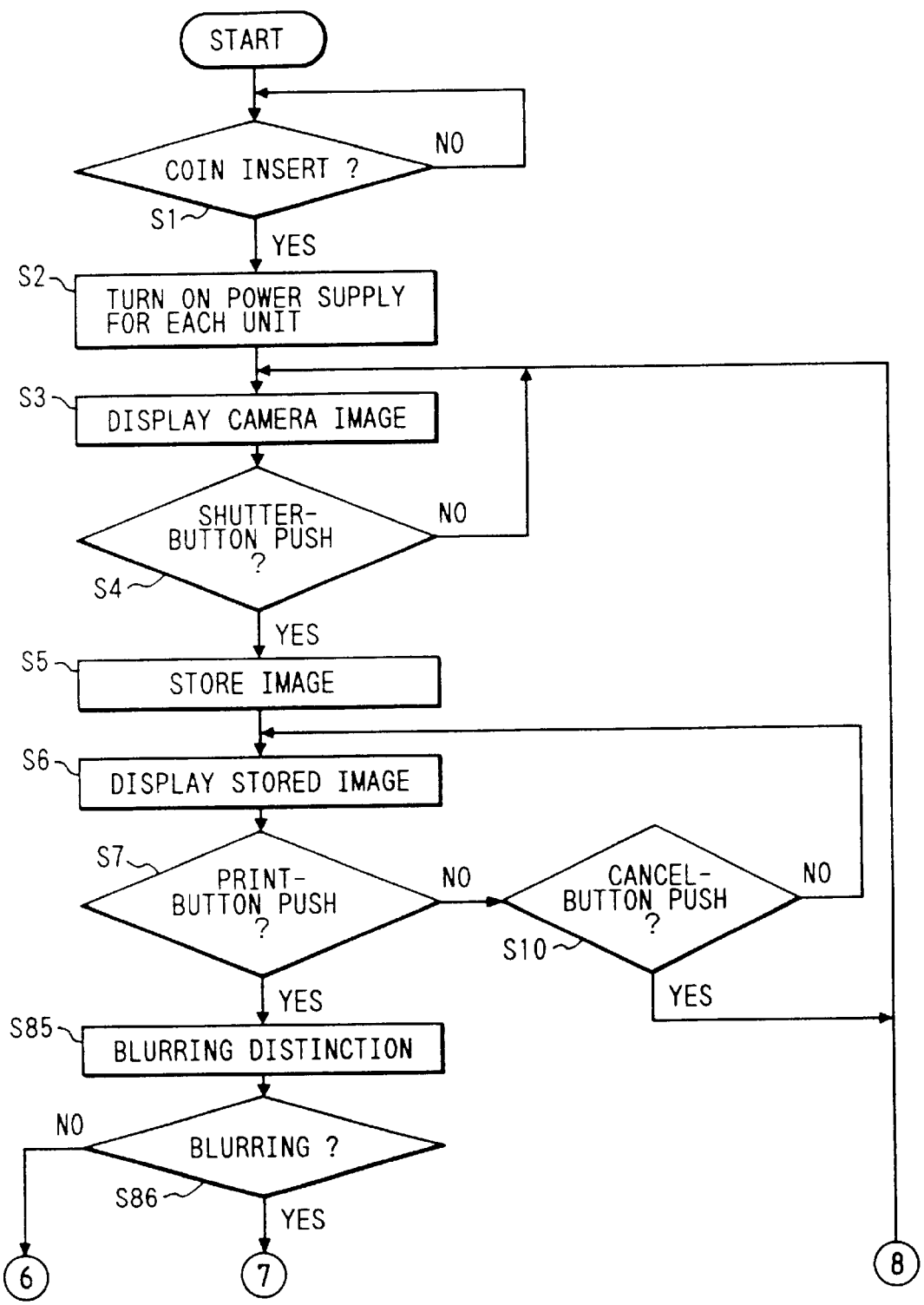
FIG. 33 is a flowchart of the operation in a system control unit 16 as shown in FIG. 27.
Figure 34:
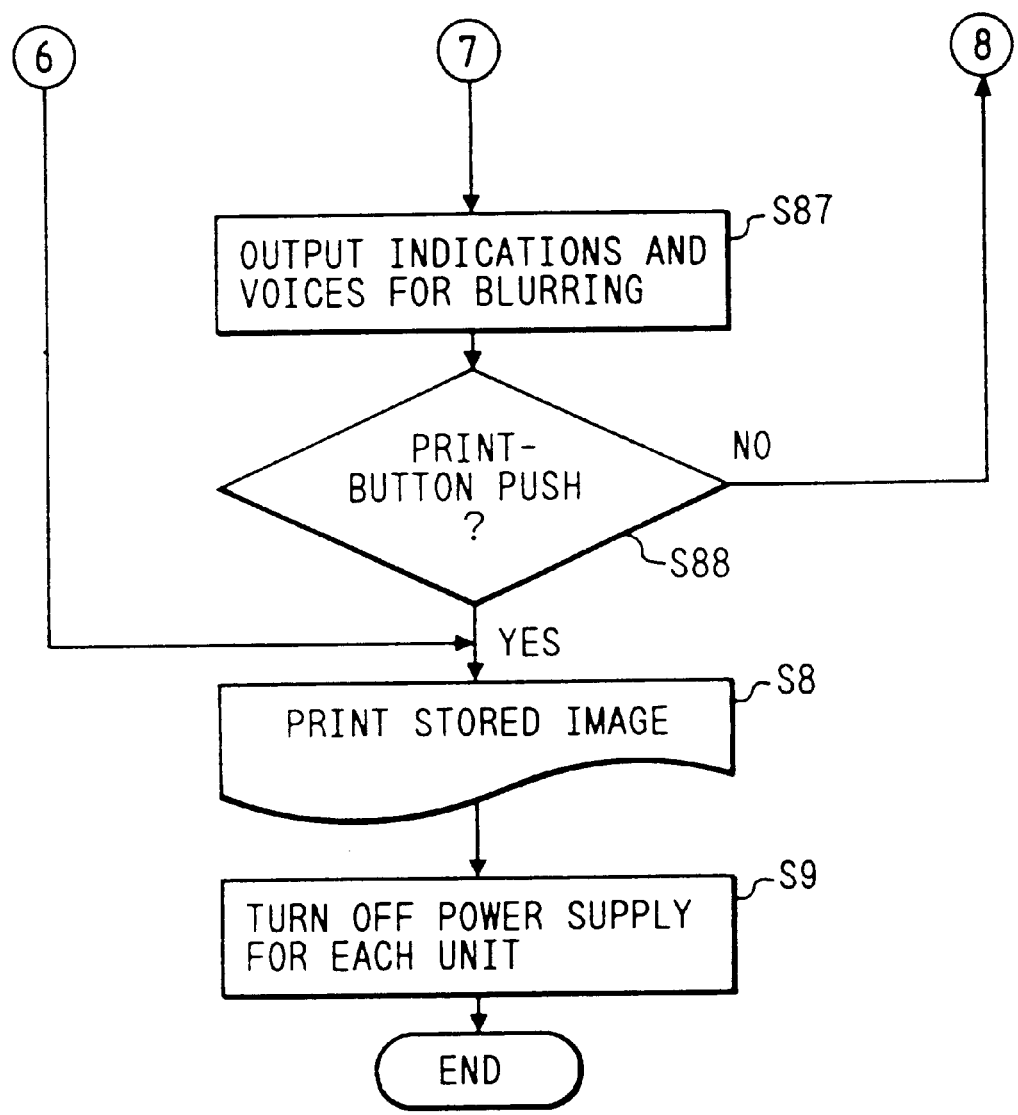
FIG. 34 is a flowchart of the operation in the system control unit 16 as shown in FIG. 27.

Next, a flowchart of the operation in the system control unit 16 of an electronic photo system with the above configuration is shown in FIGS. 33 and 34. The steps S1 to S7 and S10 are the same as in FIG. 3. If the print button 17b is depressed at step S7, the detection of the blurring for the stored image as previously described is performed by the blurring detector 85. At step S85, if the blurring detector 85 detects the blurring of stored image and the system control unit 16 receives a blurring detection signal from the blurring detector 85, a message such as "Blurring" from the character generating circuit 86 is output to the monitor 14 to inform the user of the blurring. At the same time, the chime sound or the voice such as "Blurring" is output via the signal amplifier 87 from the speaker 88 (step S87). If the print button 17b is depressed (step S88), after informing the user of the blurring, the stored image is printed by the video printer 18 (step S8). After the completion of the print, a print termination signal is sent from the video printer 18 to the system control unit 17, and further a signal is sent to the power supply unit 15 to turn off the supply of the power to each unit (step S9). Then the operation is terminated.

At step S88, if the print button 17b is not depressed, the operation proceeds to step S3, where a further photograph is taken again without printing of the blurred image.

At step S86, if there is no blurring, the operation proceeds to step S8, where the normal print operation is performed.

In this way, if there is any blurring in photographing, the user is alarmed before the image is printed, so that the false picture in photographing is never printed.

Next, another example of the present invention will be described below.

This example is one of correcting for the blurring of stored image, if any, by further developing the method of detecting the movement vector as shown in FIGS. 31 and 32.

As previously described with the image processing system of FIG. 27, if the movement vector is detected for each block in the first field, the movement vector for each block is as shown in FIG. 35 so that the blurred block can be detected. The blurring detector 85 writes the image information of block having the blurring dsetected in the first field to the position corresponding to the block of the first field in the second field, as shown in FIGS. 36 and 37 (in the figure, 1 indicates the first field image, and 2 indicates the second field image). As a result, the image in the first field remains unchanged and the image in the second field is the first field image for blurred image or the second field image for unblurred block, as shown in FIG. 38, so that the image without blurring can be printed.

In this way, if the blurring may occur in photographing, the blurring can be corrected, and the picture without blurring can be obtained.

What is claimed is:

1. An image processing apparatus comprising:
   a pick-up unit for picking-up a subject;
   a temporal storage unit for temporarily storing plural sets of image information picked up by said pick-up unit during plural predetermined time periods;
   a display unit for displaying the plural sets of image information stored in said temporal storage unit and image information from said pick-up unit, said display unit being constituted so that a subject views the display unit during image pick-up;
   a control unit for performing control to cause said temporal storage unit to store the plural sets of image information corresponding to the same subject picked up by said pick-up unit during the predetermined time periods, and to cause said display unit to display the plural sets of image information corresponding to the same subject and stored in said temporal storage unit discriminatively from the image information from said pick-up unit; and a selector unit for selecting at least one of the plural sets of image information corresponding to the same subject and stored in said temporal storage unit.

2. The image processing apparatus according to claim 1, wherein said temporal storage unit stores the image information for each of the predetermined time periods.

3. The image processing apparatus according to claim 1, wherein said temporal storage unit stores the plural image information in the plural predetermined time periods in response to a timing at which a predetermined instruction is input.

4. The image processing apparatus according to claim 3, wherein said temporal storage unit stores the plural image information at a predetermined time after the predetermined instruction is input.

5. The image processing apparatus according to claim 3, wherein the predetermined instruction is performed by a manual input.

6. The image processing apparatus according to claim 1, wherein said display unit simultaneously displays the plural image information stored in said temporal storage unit.

7. The image processing apparatus according to claim 1, further comprising a detector unit for detecting money, and a controller unit for enabling an operation of the image processing apparatus in accordance with a detection by said detector unit.

8. The image processing apparatus according to claim 1, wherein said display unit is constructed such that said subject can see the plural image information during image pick-up.

9. An image processing method comprising:

an image pick-up step, of picking up a subject in plural sets of predetermined time periods;

a temporal storage step, of temporarily storing the picked up plural sets of image information in a temporal storage unit;

a display step, of displaying the plural sets of image information stored in the temporal storage unit and image information from the pick-up unit, said display step being performed such that the subject views a display during image pick-up;

a control step, of performing control to cause the temporal storage unit to store the plural sets of image information corresponding to the same subject picked up by the pick-up unit during the predetermined time periods, and to cause the display unit to display the plural sets of image information corresponding to the same subject and stored in the temporal storage unit discriminatively from the image information from the pick-up unit; and a selection step, of selecting at least one of the plural sets of image information corresponding to the same subject and stored in the temporal storage unit.

10. The image processing method according to claim 9, wherein the temporal storage unit stores the plural image information for each predetermined time period.

11. The image processing method according to claim 10, wherein the temporal storage unit stores the plural image information in the plural predetermined time periods in response to a timing at which a predetermined instruction is input.

12. The image processing method according to claim 11, wherein said temporal storage step stores the plural image information at a predetermined time after the predetermined instruction is input.

13. The image processing method according to claim 11, wherein the predetermined instruction is performed by a manual input.

14. The image processing method according to claim 9, further comprising a recording step, of recording at least one of the plural sets of image information selected in said selection step on a recording medium.

15. The image processing method according to claim 9, wherein, in said display step, the plural image information stored in the temporal storage unit is simultaneously displayed.

16. The image processing method according to claim 9, further comprising a detecting step, of detecting money, and a step of enabling an operation of image processing in accordance with a detection performed in said detecting step.

17. The image processing method according to claim 9, wherein said display step includes displaying such that the subject can see the plural image information during image pick-up.

18. A storage medium in which contents of a control operation are read by an image processing apparatus, the image processing apparatus including:

a pick-up unit for picking up a subject;

a temporal storage unit for temporarily storing plural sets of image information; and a display unit for displaying the plural sets of image information stored in the temporal storage unit and image information from the pick-up unit, the display unit being constituted so that the subject views the display during image pick-up; and a control unit for performing a control operation to cause the temporal storage unit to store the plural sets of image information corresponding to the same subject picked up by the pick-up unit during the predetermined time periods, and to cause the display unit to display the plural sets of image information corresponding to the same subject and stored in the temporal storage unit discriminatively from the image information from the pick-up unit;

the contents of the control operation comprising:

an image pick-up step, of picking-up the subject by means of the pick-up unit in plural sets of predetermined time periods;

a temporal storage step, of temporarily storing in the temporal storage unit the plural sets of image information picked up by the pick-up unit; and a selecting step, of selecting at least one of the plural sets of image information corresponding to the same subject and stored in the temporal storage unit.

19. The storage medium according to claim 18, wherein said temporal storage step includes storing the plural image information for each predetermined time period.

20. The storage medium according to claim 18, wherein said temporal storage step includes storing the plural image information in the plural predetermined time periods in response to a timing at which a predetermined instruction is input.

21. The storage medium according to claim 20, wherein said temporal storage step includes storing the image information at a predetermined time after the predetermined instruction is input.

22. The storage medium according to claim 20, wherein the predetermined instruction is performed by manual input.

23. The storage medium according to claim 18, wherein the image processing apparatus further includes a recorder unit for recording the plural sets of image information on a recording medium, and said contents of the control operation further comprises a recording step, of recording the selected sets of image information on a recording medium, using the recording unit.

24. The storage medium according to claim 18, the plural sets of image information stored in the temporal storage unit are simultaneously displayed.

25. The storage medium according to claim 18, further comprising a step of detecting money, and a step of enabling an operation of image processing in accordance with the detection of the money.

26. The storage medium according to claim 18, wherein the display unit is constructed such that the subject views the plural image information during image pick-up.

27. The image processing apparatus according to claim 1, further comprising a recorder unit for recording the at least one of the plural image information selected by said selector unit on a recording medium.

28. The image processing method according to claim 14, wherein said recording step is performed by printing.

29. The storage medium according to claim 23, wherein said recording step includes performing printing.

30. The image processing apparatus according to claim 27, wherein said recorder unit performs printing.

31. A control method of an image processing apparatus, said apparatus comprising a pick-up unit for picking up a subject and a storage unit for storing plural sets of image information picked up by said pick-up unit during plural predetermined time periods and a display unit for displaying the plural sets of image information stored in the storage unit and image information from the pick-up unit, the display unit being constituted so that a subject views the display unit during image pick-up, said method comprising:

a storage step, of storing the plural sets of image information corresponding to the same subject and picked up by the pick-up unit during the plural predetermined time periods to the storage unit;

a display step, of displaying the plural sets of image information corresponding to the same subject and stored in the storage unit on the display unit discriminatively from the image information from the pick-up unit; and a selecting step, of causing to select at least one of the plural sets of image information corresponding to the same subject and stored in the storage unit.

32. The control method according to claim 31, wherein the storage unit stores the plural sets of image information for each predetermined time period.

33. The control method according to claim 32, wherein the storage unit stores the plural sets of image information in the plural predetermined time periods in response to a timing at which a predetermined instruction is input.

34. The control method according to claim 33, wherein the storage unit includes storing the plural sets of image information at a predetermined time after the predetermined instruction is input.

35. The control method according to claim 33, wherein the predetermined instruction is performed by a manual input.

36. The control method according to claim 31, further comprising a recording step, of recording the at least one of the plural sets of image information corresponding to the same subject and selected, on a recording medium.

37. The control method according to claim 31, wherein the display unit displays the plural sets of image information stored in the storage unit.

38. The control method according to claim 31, further comprising a detection step, of detecting money, and an enabling step, of enabling an operation of image processing in accordance with a detection performed in said detecting step.

39. The control method according to claim 31, wherein the display unit displays the image in a manner that the subject can see the plural sets of image information during image pick-up.

40. The control method according to claim 36, wherein said recording step is performed by printing.

* * * * *

UNITED STATES PATENT AND TRADEMARK OFFICE
CERTIFICATE OF CORRECTION

PATENT NO. : 6,809,757 B1
DATED : October 26, 2004
INVENTOR(S) : Kan Ito et al.

It is certified that error appears in the above-identified patent and that said Letters Patent is hereby corrected as shown below:

Column 5,
Line 46, "(step S2)." should read -- (step S20). --.

Column 15,
Line 65, "stores" should read -- includes storing --.

Column 17,
Line 3, "comprises" should read -- comprise --; and
Line 7, "18, the" should read -- 18, wherein the --.

Signed and Sealed this

Sixth Day of September, 2005

JON W. DUDAS
*Director of the United States Patent and Trademark Office*